US012657665B2

(12) United States Patent
    Jadidian et al.

(10) Patent No.: US 12,657,665 B2
(45) Date of Patent: Jun. 16, 2026

(54) SYSTEMS, APPARATUSES, AND METHODS FOR ACTIVE ALIGNMENT FOR VIDEO PASSTHROUGH OF MODULAR SENSORS AND HEAD-MOUNTED DISPLAYS

(71) Applicant: Rivet Industries, Inc., Washington, DC (US)

(72) Inventors: Jouya Jadidian, Los Gatos, CA (US); Calin Cristian, Iasi (RO); Seyedsohrab Madani, Menlo Park, CA (US); Erik Holverson, Redmond, WA (US); Mohit Narang, Cupertino, CA (US)

(73) Assignee: Rivet Industries, Inc., Washington, DC (US)

( * ) Notice: Subject to any disclaimer, the term of this patent is extended or adjusted under 35 U.S.C. 154(b) by 0 days.

(21) Appl. No.: 19/074,963

(22) Filed: Mar. 10, 2025

(65) Prior Publication Data

US 2026/0080509 A1 Mar. 19, 2026

Related U.S. Application Data

(60) Provisional application No. 63/656,565, filed on Jun. 5, 2024.

(51) Int. Cl.
   *G06T 5/50* (2006.01)
   *G06T 7/73* (2017.01)

(52) U.S. Cl.
   CPC .................. *G06T 5/50* (2013.01); *G06T 7/73* (2017.01); *G06T 2207/10152* (2013.01); *G06T 2207/20212* (2013.01); *G06T 2207/30204* (2013.01)

(58) Field of Classification Search
   None
   See application file for complete search history.

(56) References Cited

U.S. PATENT DOCUMENTS

| | | | |
|---|---|---|---|
| 8,678,282 | B1 | 3/2014 | Black et al. |
| 9,953,618 | B2 | 4/2018 | Ramachandran et al. |

(Continued)

FOREIGN PATENT DOCUMENTS

WO    WO-2023230085 A1    11/2023

OTHER PUBLICATIONS

Lai, C-J. et al., "View interpolation for video see-through head-mounted display," SIGGRAPH '16: ACM SIGGRAPH 2016 Posters, (Jul. 24, 2016), Article No. 57; 2 pages.

(Continued)

*Primary Examiner* — Nurun Flora
(74) *Attorney, Agent, or Firm* — COOLEY LLP

(57)          ABSTRACT

An apparatus can include a sensor hub couplable to a head-mounted display (HMD), the sensor hub including sensors and light sources. The apparatus can further include a processor configured to generate, by activating the plurality of light sources, a constellation including a set of illuminated points, receive a first set of images captured by a camera of the HMD, the first set of images including a portion of the constellation and an environment near the HMD from a first perspective, receive a second set of images capturing the environment from a second perspective, identify a subset of illuminated points, determine position information of the sensor hub, and modify the second set of images based at least in part on the position information of the sensor hub to produce a modified second set of images showing the second portion of the environment modified to be from the first perspective.

30 Claims, 16 Drawing Sheets

(56) References Cited

U.S. PATENT DOCUMENTS

| 10,587,868 | B2 * | 3/2020 | Yun | G06F 3/012 |
| 12,106,534 | B2 | 10/2024 | Valluru et al. | |
| 2017/0045736 | A1 | 2/2017 | Fu | |
| 2018/0074599 | A1 * | 3/2018 | Garcia | G06F 3/04886 |
| 2020/0012352 | A1 | 1/2020 | Yang | |
| 2021/0200497 | A1 | 7/2021 | Torii et al. | |
| 2021/0216136 | A1 * | 7/2021 | Bashkirov | G06F 3/0346 |
| 2021/0257084 | A1 | 8/2021 | Freeman et al. | |
| 2022/0137705 | A1 * | 5/2022 | Hashimoto | G06F 1/1694 |
| | | | | 345/156 |
| 2022/0171187 | A1 * | 6/2022 | Bleyer | H04N 23/63 |
| 2023/0128392 | A1 | 4/2023 | Sagong et al. | |
| 2024/0257309 | A1 | 8/2024 | Holland | |
| 2024/0265570 | A1 | 8/2024 | Shirguppe et al. | |
| 2025/0168313 | A1 | 5/2025 | Chui | |

OTHER PUBLICATIONS

Andersen, M. V. et al., "Learning to Find Missing Video Frames with Synthetic Data Augmentation: A General Framework and Application in Generating Thermal Images Using RGB Cameras," arXiv:2403.00196 [cs.CV], Feb. 29, 2024; 6 pages.

Kniaz, V. V. et al., "ThermalGAN: Multimodal Color-to-Thermal Image Translation for Person Re-identification in Multispectral Dataset," Computer Vision—ECCV 2018 Workshops (ECCV 2018), Jan. 23, 2019, pp. 606-624.

Parmar, G. (GaParmar), "img2img-turbo," Github.com, published on Sep. 8, 2024. Retrieved from https://github.com/GaParmar/img2img-turbo, [retrieved on Jun. 23, 2025]; 4 pages.

U.S. Appl. No. 19/204,418, filed May 9, 2025, by Cristian et al.

PCT Application No. PCT/US2025/032385, International Search Report and Written Opinion mailed Oct. 16, 2025, Applicant Rivet Industries, Inc.; 10 pages.

* cited by examiner

400

402

CABLE-BH-SA

HELMET-MOUNT-HINGE

420

SENSOR ARRAY

430

CABLE-BH-HR

404

CABLE-BH-GLASSES

AR device

CWB 2　CWB 1

VULSOR BATTERY HUB

406

LEADER RADIO

1200

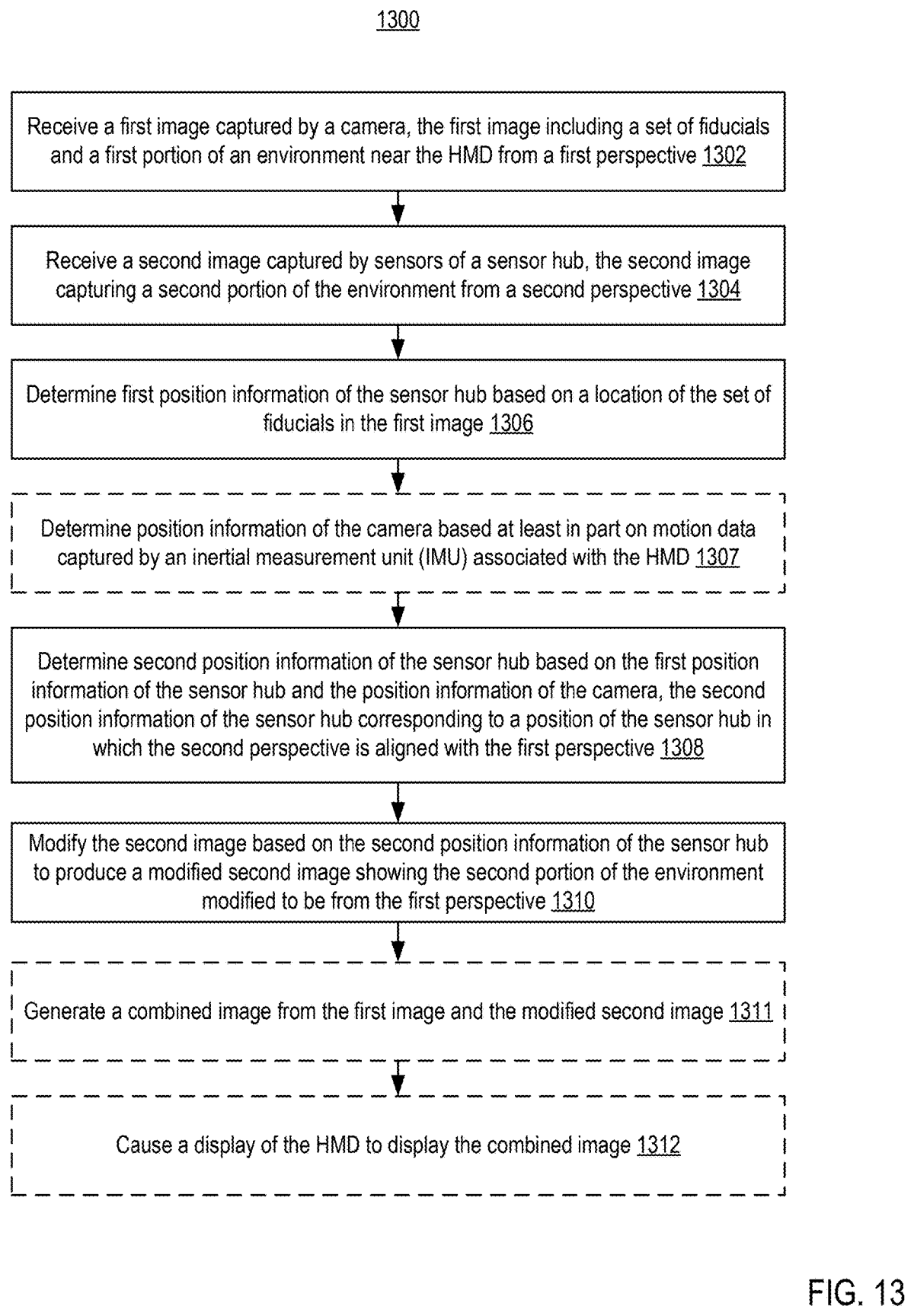

1300

Receive a first image captured by a camera, the first image including a set of fiducials and a first portion of an environment near the HMD from a first perspective 1302

Receive a second image captured by sensors of a sensor hub, the second image capturing a second portion of the environment from a second perspective 1304

Determine first position information of the sensor hub based on a location of the set of fiducials in the first image 1306

Determine position information of the camera based at least in part on motion data captured by an inertial measurement unit (IMU) associated with the HMD 1307

Determine second position information of the sensor hub based on the first position information of the sensor hub and the position information of the camera, the second position information of the sensor hub corresponding to a position of the sensor hub in which the second perspective is aligned with the first perspective 1308

Modify the second image based on the second position information of the sensor hub to produce a modified second image showing the second portion of the environment modified to be from the first perspective 1310

Generate a combined image from the first image and the modified second image 1311

Cause a display of the HMD to display the combined image 1312

FIG. 13

SYSTEMS, APPARATUSES, AND METHODS FOR ACTIVE ALIGNMENT FOR VIDEO PASSTHROUGH OF MODULAR SENSORS AND HEAD-MOUNTED DISPLAYS

CROSS REFERENCE TO RELATED APPLICATION

This application claims priority to U.S. Provisional Patent Application No. 63/656,565, filed Jun. 5, 2024, and titled "METHODS AND APPARATUS FOR ACTIVE ALIGNMENT PASSTHROUGH FROM DETACHED SENSORS AND HEAD-MOUNTED DISPLAYS," the contents of which are incorporated by reference herein in its entirety.

FIELD

The present disclosure generally relates to imaging, and more specifically to systems, devices, and methods for active alignment of video passthrough from detachable and modular sensors and head-mounted displays.

BACKGROUND

Modularity is desirable in mission critical and ruggedized hardware including, for example, head-mounted displays (HMDs) such as augmented reality (AR) displays. Such displays, however, are often configured with different types of sensors in fixed customized arrangements. These sensors are often placed in front of the eyes of a user with a distance identical (or similar) to the interpupillary distance for beneficial passthrough experience. That said, when the sensors and the display are not placed on the same rigid structure, they can move with respect to each other. Such relative movement between the sensors and the display can cause discomfort especially if the movements are unintentional and recurrent such as walking or riding in a vehicle or made abruptly by the user such as glasses and/or helmet adjustment. The nature of these relative movements is that they are unpredictable.

Thus, a need exists to provide alignment between a set of sensors and a display when not rigidly coupled together, for example, on a common rigid structure.

SUMMARY

In an embodiment, an apparatus can include a sensor hub couplable to a head-mounted display (HMD), the sensor hub including sensors and a plurality of light sources arranged in a predefined pattern. The apparatus can further include a processor operably coupled to the sensor hub and couplable to the HMD. The processor can be configured to generate, by activating the plurality of light sources, a constellation including a set of illuminated points for a predetermined period of time. The processor can be further configured to receive, during the predetermined period of time, a first set of images captured by a camera of the HMD, the first set of images including a portion of the constellation and a first portion of an environment near the HMD from a first perspective. The processor can be further configured to receive a second set of images captured by the sensors, the second set of images capturing a second portion of the environment from a second perspective. The processor can be further configured to identify a subset of illuminated points of the set of illuminated points in the first set of images. The processor can be further configured to determine position information of the sensor hub using the subset of illuminated points identified in the first set of images. The processor can be further configured to modify the second set of images based at least in part on the position information of the sensor hub to produce a modified second set of images showing the second portion of the environment modified to be from the first perspective.

In an embodiment, a non-transitory processor-readable medium stores code representing instructions to be executed by one or more processors. The instructions comprise code to cause the one or more processors to generate, by activating a plurality of light sources of a sensor hub, a constellation including a set of illuminated points for a predetermined period of time, the sensor hub couplable to a head-mounted display (HMD), the plurality of light sources arranged in a predefined pattern. The instructions comprise code to cause the one or more processors to further receive, during the predetermined period of time, a first set of images captured by a camera of the HMD, the first set of images including a portion of the constellation and a first portion of an environment near the HMD from a first perspective. The instructions comprise code to cause the one or more processors to further receive a second set of images captured by sensors of the sensor hub, the second set of images capturing a second portion of the environment from a second perspective. The instructions comprise code to cause the one or more processors to further identify a subset of illuminated points of the set of illuminated points in the first set of images. The instructions comprise code to cause the one or more processors to further determine position information of the sensor hub using the subset of illuminated points identified in the first set of images. The instructions comprise code to cause the one or more processors to further modify the second set of images based at least in part on the position information of the sensor hub to produce a modified second set of images showing the second portion of the environment modified to be from the first perspective.

In an embodiment, an apparatus can include a sensor hub couplable to a head-mounted display (HMD), the sensor hub including sensors and a set of fiducials within a field of view of a camera of the HMD. The apparatus can further include a processor operably coupled to the sensor hub and couplable to the HMD. The processor is configured to receive a first image captured by the camera, the first image including the set of fiducials and a first portion of an environment near the HMD from a first perspective. The processor is further configured to receive a second image captured by the sensors, the second image capturing a second portion of the environment from a second perspective. The processor is further configured to determine first position information of the sensor hub based on a location of the set of fiducials in the first image. The processor is further configured to determine second position information of the sensor hub based on the first position information of the sensor hub and position information of the camera, the second position information of the sensor hub corresponding to a position of the sensor hub in which the second perspective is aligned with the first perspective. The processor is further configured to modify the second image based on the second position information of the sensor hub to produce a modified second image showing the second portion of the environment modified to be from the first perspective.

In an embodiment, a non-transitory processor-readable medium can store code representing instructions to be executed by one or more processors. The instructions comprise code to cause the one or more processors to receive a first image captured by a camera of a head-mounted display (HMD), the first image including a set of fiducials of a sensor hub couplable to the HMD, the set of fiducials within a field of view of the camera, and a first portion of an environment near the HMD from a first perspective. The instructions comprise code to cause the one or more processors to further receive a second image captured by sensors of the sensor hub, the second image capturing a second portion of the environment from a second perspective. The instructions comprise code to cause the one or more processors to further determine first position information of the sensor hub based on a location of the set of fiducials in the first image. The instructions comprise code to cause the one or more processors to further determine second position information of the sensor hub based on the first position information of the sensor hub and position information of the camera, the second position information of the sensor hub corresponding to a position of the sensor hub in which the second perspective is aligned with the first perspective. The instructions comprise code to cause the one or more processors to further modify the second image based on the second position information of the sensor hub to produce a modified second image showing the second portion of the environment modified to be from the first perspective.

BRIEF DESCRIPTION OF THE DRAWINGS

FIG. 13 illustrates a flowchart of another method to modify images from a sensor hub to be from a perspective of a camera of a HMD, according to an embodiment.

DETAILED DESCRIPTION

Modularity of sensors is often desirable for ruggedized hardware such as head-mounted displays (HMDs) or other augmented reality (AR) displays. For example, one or more sensors (also referred to herein as a "modular sensor array" or a "sensor array") can be in a modular form factor (e.g., in a modular attachment) that allows the sensors to be changed, switched out, or removed depending on the use. In some embodiments, the sensors can be mounted or supported on an associated sensor hub, sensor bar, or other mount depending on the use, and individual sensors can be switched out and/or the sensor hub, sensor bar, etc. can be switch out. Such a modular form factor, however, can involve the sensors not being rigidly coupled to a primary display device, such as the HMD. When the sensors and the primary display device are not placed on the same rigid structure, they can move with respect to each other, as further described herein. Such relative movement between the sensors and the primary display device can cause discomfort or disorientation especially if the movements are recurrent such as walking or riding in a vehicle.

Systems and devices described herein can provide alignment of image frames captured by a sensor hub with those captured by a separate display device (e.g., a HMD), where the sensor hub and the display device are not rigidly coupled to one another. The alignment of image frames can help reduce or eliminate the effects (e.g., the discomfort, disorientation) that otherwise would occur from the relative movement between the sensor hub and the display device. In some embodiments, a device or system can modify an image captured by a sensor hub based on position information associated with the sensor hub and/or a camera of the HMD such that the modified image shows a perspective of the camera (e.g., rather than a perspective of the sensor hub). As such, the perspective of the sensor hub can be aligned with the perspective of the camera. In some embodiments, the device can determine position information of the sensor hub based on a constellation (e.g., a set of illuminated points) generated by the sensor hub, the constellation being at least partially in a field of view of the camera of the HMD. In some embodiments, the device determines position information of the sensor hub based on fiducials or other physical markings disposed on the sensor hub, the fiducials or physical markings being at least partially in a field of view of the camera of HMD. In some embodiments, systems, devices, and methods described herein can continuously, periodically, and/or automatically align perspectives of a sensor hub and a HMD to provide a user with an up-to-date, detailed view of their environment.

Figure 1:
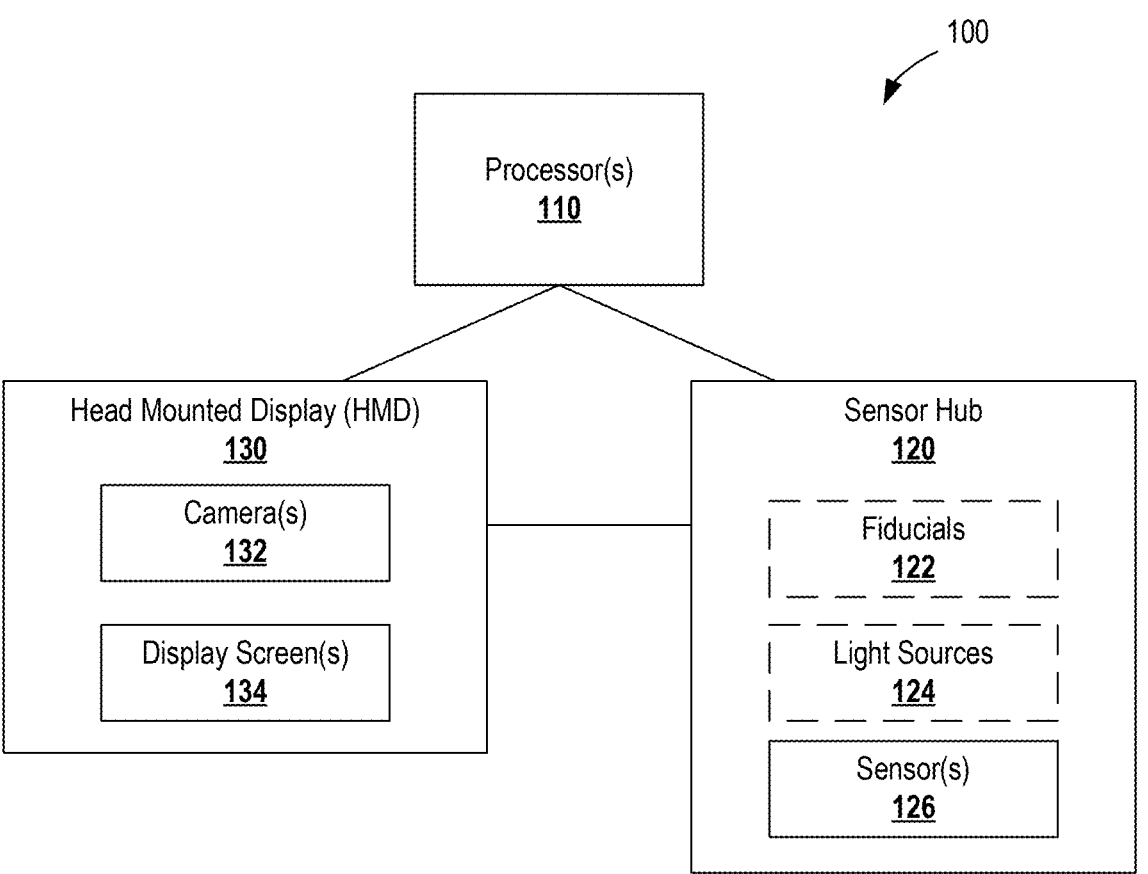
FIG. 1 is a block diagram of an alignment system, according to an embodiment.

FIG. 1 is a block diagram of an alignment system 100, according to an embodiment. As shown in FIG. 1, the alignment system includes a processor 110, a sensor hub 120, and a HMD 130, which are connected to one another (e.g., via a wired or wireless connection). The HMD 130 can include camera(s) 132 and display screen(s) 134 (also referred to herein as "display(s)"). The sensor hub 120 can include one or more sensors 126. Optionally, the sensor hub 120 can also include one or more other devices, such as one or more fiducials 122 and/or one or more light sources 124.

The HMD 130 can be, for example, worn on the head or as part of a helmet, hat, or other head-worn device that has a small display optic in front of one eye or each eye. The HMD 130 can include one or more sensor(s) that can track information regarding the user and/or an environment surrounding the user. In some embodiments, the HMD 130 is a virtual reality (VR), mixed reality (MR), or augmented reality (AR) headset that tracks three-dimensional (3D) position and rotation to provide a virtual environment to the user. Such a headset of the HMD 130 can be a three-degree of freedom (3DOF) headset having an inertial measurement unit (IMU) or a 6DOF headset using sensor fusion from multiple sensors/data sources including at least one IMU. In addition to an IMU, sensor(s) can include an accelerometer, a gyroscope, a thermal imager, a WiFi® sensor (e.g., a WiFi® receiver or a WiFi® transceiver), a radar sensor, a magnetometer, etc. In some embodiments, the HMD 130 can be implemented in other form factors, such as, for example, glasses, goggles, etc.

In some embodiments, the camera(s) 132 can include one or more imaging devices, such as, for example, an optical or infrared camera. In some embodiments, the camera 132 can be a low light imaging camera (e.g., that uses high-sensitivity image sensors, that has larger sensors and/or individual pixels, have wider aperture lens like f/1.2 or f/1.4, etc.). The camera 132 can capture an environment around a user of the HMD 130. For example, the camera 132 can capture an image feed or image data of a scene or environment around a user wearing the HMD 130. In some embodiments, the camera 132 can capture an image feed or image data of the sensor hub 120 (e.g., when the sensor hub 120 is within a field of view of the camera 132).

The display screen(s) 134 can be, for example, optic displays positioned on the HMD 130. In some embodiments, the displays screen(s) 134 are positioned in front of one eye or each eye of a user of the HMD 130. In some embodiments, the display screen(s) 134 include a liquid crystal display (LCD) screens. The display screen(s) 134 can be configured to display images from the camera 132, images from the sensor hub 120, and/or images generated or modified by the processor 110.

The sensor hub 120 can include device hardware and/or software configured to support, control, monitor, etc., the fiducials 122, the light sources 124, and/or the sensors 126. The sensor hub 120 can communicate with or facilitate communication between the light sources 124, the sensors 126, and/or the processor 110 (e.g., for alignment with the HMD 130). Further, the sensor hub 120 can include or otherwise define a housing or other structure configured to support the fiducials 122, the light sources 124, and/or the sensors 126. In some embodiments, the sensor hub 120 is detachably couplable to the HMD 130. For example, the sensor hub 120 can include a connector (e.g., arm, hinge, pin, etc.), and/or the HMD 130 can include a connector, such that the sensor hub 120 and the HMD 130 are couplable to one another via the connector(s). Alternatively, the sensor hub 120 is separate from the HMD 130; the sensor hub 120 and the HMD 130, however, can both be worn by a user or be positioned in close proximity to one another. Typically though, the sensor hub 120 is not disposed on or supported by a unitary rigid structure (e.g., monolithically formed rigid structure) with the HMD 130, which may lead the sensor hub 120 to be displaceable relative to the HMD 130 (e.g., based on a pliancy of the connector or other structure(s) supporting the sensor hub 120 and the HMD 130). Further, the sensor hub 120 can include one or more connectors that allow for one modular sensor hub (e.g., the sensor hub 120) to be switched out with another modular sensor hub, for example, by disconnecting and removing the connector(s) of the former and adding and connecting the connector(s) of the latter.

The sensor(s) 126 are configured to capture images of an environment of or near the system 100. In some embodiments, the sensor(s) 126 can include, for example, a combination of two or more sensor(s) with two or more sensor types. For example, the sensor(s) 126 can include at least two of an IMU, an accelerometer, a gyroscope, a camera, a red-blue-green (RBG) camera, a low light camera, a thermal camera, a WiFi® sensor (or a WiFi® transceiver or a WiFi® receiver), a radar sensor, a magnetometer, etc.

As described above, the sensor hub 120 may not be mounted in a rigid, non-movable manner to the HMD 130. Therefore, systems and devices described herein can be configured to localize spatially dependent signals and/or data captured by the sensor(s) 126 of the sensor hub 120 (such as, for example, images captured by a camera mounted to the sensor hub 120) relative to images and/or video captured by the camera(s) of the HMD 130. In some embodiments, systems, devices, and methods described herein can track a movement of the sensor hub 120 (and components thereof) relative to the HMD 130. In some embodiments, systems, devices, and methods described herein can modify one or more images captured by a camera disposed on the sensor hub 120 from a first perspective associated with that camera to a second perspective associated with a camera 132 of the HMD 130.

In some embodiments, tracking of the movement of the sensor hub 120 can be implemented using fiducials, such as fiducials 122. The fiducials 122 can be objects, markers, images, etc., disposed on the sensor hub 120. The fiducials 122 can be disposed on the sensor hub 120 such that they are within the field of view of the camera(s) 132 of the HMD 130. The fiducials 122 can be configured to be used as a point of reference for the alignment system 100 to track a position of the sensor hub 120 relative to the HMD 130. In some embodiments, the fiducials 122 can be used to align image data captured from a perspective of a sensor 126 (e.g., a camera) of the sensor hub 120 with image data captured from a perspective of the camera 132, as described in further detail below. In some implementations, the fiducials 122 are arranged in a grid-like or checkerboard pattern. In some implementations, the fiducials 122 are positioned on a surface of the sensor hub 120 that faces the camera 132, such as, for example, a back surface of the sensor hub 120. The sensor(s) 126 can be positioned on the sensor hub 120 such that the sensor(s) 126 can capture data of an environment of or near the sensor hub 120 and/or HMD 130. For example, the sensor(s) 126 can be positioned on a front surface of the sensor hub 120, or on a surface that faces away from the camera 132 and/or HMD 130. In some implementations, the fiducials 122 are statically positioned on the sensor hub 120, i.e., the fiducials 122 do not move relative to the sensor hub 120. For example, the fiducials 122 can have a fixed position on the sensor hub 120 such that the position of the fiducials 122 is known, constant, etc.

In some implementations, tracking of the movement of the sensor hub 120 can be implemented using one or more light source(s), such as light sources 124. The light sources 124 can be a set of illuminated points (e.g., light emitting diodes (LEDs)) arranged in a predefined pattern on or within the sensor hub 120. In some embodiments, the light sources 124 can be a set of illuminated points arranged in a ring-like or circular pattern. Alternatively, the light sources 124 can be a set of illuminated points arranged in a known pattern similar to, for example, a constellation. Still alternatively, the light sources 124 can be a set of illuminated points arranged randomly. In some embodiments, the light sources 124 may have a fixed position on the sensor hub 120 such that the position of the light sources 124 (e.g., each point in the set of illuminated points) is known, constant, etc. In some embodiments, the light sources 124 are configured to illuminate, flash, etc., to generate the set of illuminated points according to a predetermined sequence. For example, the light sources 124 can activate (e.g., iteratively brighten and dim) each illuminated point of the set of illuminated points according to a predetermined sequence uniquely associated with that illuminated point. An activated set of illuminated points can be referred to herein as a "constellation." In some implementations, the constellation includes at least two illuminated points. In some implementations, the constellation includes at least three illuminated points. The alignment system 100 may need to identify at least three illuminated points to localize a plane (e.g., a surface of the sensor hub 120) in 3D space. In some implementations, a processor (e.g., processor(s) 110) can be configured to control the activation of the light sources 124, e.g., by controlling their brightness or luminosity, by controlling the frequency and/or pattern of activation, and/or by controlling which light sources 124 to activate.

The sensor hub 120 and/or the HMD 130 can be operably coupled to (e.g., directly or through a network) and/or include one or more processors 110. The processor 110 can be configured to facilitate communications and/or transmissions between and/or within the sensor hub 120 and/or the HMD 130 for alignment therebetween, as further described in detail below. The processor 110 (e.g., a central processing unit (CPU), a graphics processing unit (GPU), and/or the like) can be, for example, a hardware-based integrated circuit (IC) or any other suitable processing device configured to run or execute a set of instructions or codes. In some implementations, the processor 110 can execute instructions stored in a memory (e.g., a local memory, or a remotely situated memory) to perform one or more processes and/or functions associated with tracking the movement of the sensor hub 120 and/or aligning data of the sensor hub 120 with that of the HMD 130, including processing sensor data from the sensor hub 120 and/or HMD 130 (e.g., image data, IMU data), determining a relative position of the sensor hub 120 relative to the HMD 130, generating or modifying one or more images, projecting or reprojecting via the display 116 a view to a user of the HMD 110, etc. The memory (not depicted) can be operably coupled to the processor 110, and can be, for example, a random-access memory (RAM), a hard drive, a flash drive, and/or the like. The processor(s) 110, sensor hub 120, and the HMD 130 can communicate with one another or other compute devices (e.g., a remote server, database, etc.) via wired connections and/or a network communication interface (e.g., a network interface card (NIC), a Wi-Fi® transceiver, a Bluetooth® transceiver, and/or the like). In some embodiments, the HMD 130 or the sensor hub 120 includes the processor(s) 110. Alternatively, the HMD 130 can include a first one of the processor(s) 110 and the sensor hub 120 can include a second one of the processor(s) 110.

Figure 2:
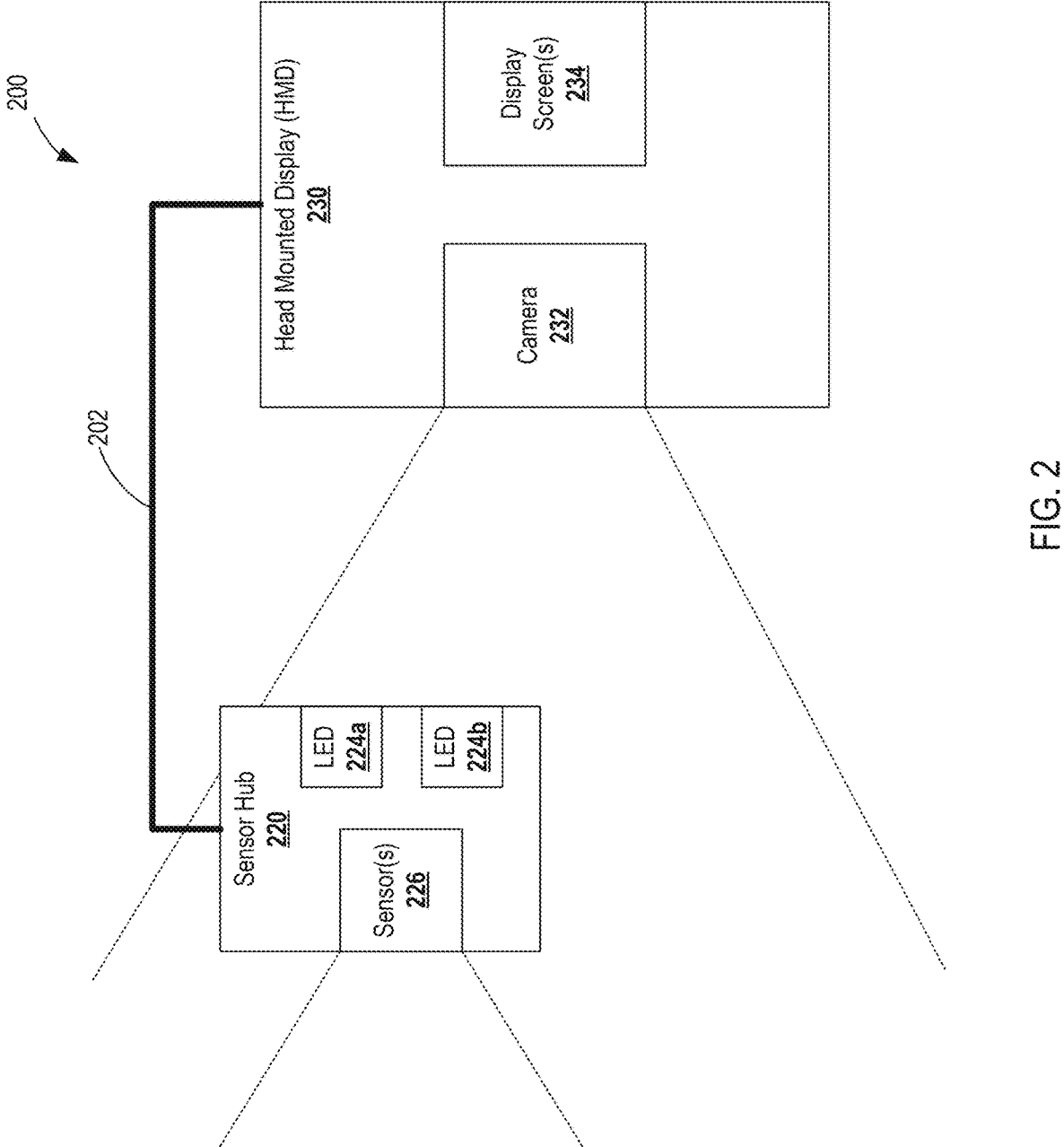
FIG. 2 schematically depicts a system including a modular sensor hub that is detachably couplable to a HMD, schematically depicting the field of view of the sensor hub and the HMD, according to an embodiment.

FIG. 2 schematically depicts a system 200, including a HMD 230 and a sensor hub 220, according to an embodiment. The system 200 of FIG. 2 can be structurally and/or functionally similar to the system 100 of FIG. 1. For example, the system 200 can include a sensor hub 220 (e.g., structurally and/or functionally similar to the sensor hub 120 of FIG. 1) having sensors 226 (e.g., structurally and/or functionally similar to the sensors 126 of FIG. 1) and LEDs 224a, 224b (e.g., structurally and/or functionally similar to the light sources 124 of FIG. 1). Further, the system 200 can include a HMD 230 (e.g., structurally and/or functionally similar to the HMD 130 of FIG. 1) having a camera 232 (e.g., structurally and/or functionally similar to the camera 132 of FIG. 1) and display screens 234 (e.g., structurally and/or functionally similar to the display screen 134 of FIG. 1). In the example of FIG. 2, the sensor hub 220 and the HMD 230 can be mechanically coupled to one another via a connector 202.

As schematically depicted, the LEDs 224a, 224b can be positioned on a surface of the sensor hub 220 facing the camera 232 of the HMD 230. As such, an image or a set of images captured by the camera 232 of an environment of or near the HMD 230 can include a portion of the surface of the sensor hub 220 that includes the LEDs 224a, 224b. Put differently, at least part of the surface of the sensor hub 220 including the LEDs 224a, 224b and at least part of the environment can be within a field of view of the camera 232. While two LEDs 224a, 224b are depicted in FIG. 2, it can be appreciated that more LEDs can be included in the sensor hub 220. Depending on a position of the sensor hub 220, each of the LEDs 224a, 224b can be wholly within a field of view of the camera 232. Alternatively, a subset of the LEDs 224a, 224b can be within a field of view of the camera 232, while a subset of the LEDs 224a, 224b can be outside of the field of view of the camera 232. In some implementations, the LEDs 224a, 224b can generate a plurality of illuminated points that are in a predefined pattern, e.g., a constellation (e.g., when the LEDs 224a, 224b are activated or illuminated). The LEDs 224a, 224b can be arranged, distributed, spaced, etc., along the surface of the sensor hub 120 in a pattern or randomly (e.g., like a constellation of stars). This arrangement and/or distribution is known or set such that positions of each of the LEDs 224a, 224b (e.g., with respect to one another) is known or set. A processor (e.g., structurally and/or functionally similar to the processor 110 of FIG. 1; not shown in FIG. 2) can then receive the images captured by the camera 232 to track a position of the LEDs 224, 224b and therefore a position of the sensor hub 220, as further described below.

In some embodiments, each of the LEDs 224a, 224b can illuminate according to a predetermined sequence for one or more predetermined period of times. This sequence, when captured by the camera 232 and recognized by the processor, can be used to uniquely identify each of the LEDs 224a, 224b. For example, the LED 224a can illuminate according to a first predetermined sequence, and the LED 224b can illuminate according to a second predetermined sequence different from the first predetermined sequence. The camera 232 can capture a set of images of the sensor hub 220 such that the illumination and/or activation of the LEDs 224a, 224b is likewise captured. In some implementations, a processor (e.g., structurally and/or functionally similar to the processor 110 of FIG. 1) can assess the set of images to uniquely identify the LEDs 224a, 224b, a position of the LEDs 224a, 224b, and, thus, a position of the sensor hub 120, as further described in detail below.

Similar to embodiments described above, the camera 232 can capture an image or set of images of the sensor hub 220 and the environment from a first perspective. Further, the sensors 226 can capture an image or set of images of the environment from a second perspective. The processor can receive the images from the sensors 226 and the camera 132, and then modify the images from the sensors 226 based on a tracked location of the sensor hub 220. In some embodiments, the modified images show the information of the environment captured by the sensors 226 from the first perspective (e.g., from the perspective of the camera 232). In some embodiments, the processor is configured to generate a combined image from the modified image and the image(s) from the camera 232. In some embodiments, the sensors 226 can be configured to capture a portion of the environment different from a portion of the environment captured by the camera 232, such as, for example, a portion of the environment that may be obstructed in the view captured by the camera 232. Alternatively, or additionally, the sensors 226 can be configured to capture different information about the environment than the camera 232. For example, the sensors 226 can include a first type of camera, while the camera 232 can include a second type of camera that is different from the first type. In some embodiments, the processor can modify the images from the sensors 226 based on position information associated with the sensor hub 220, the LEDs 224a, 224b, the camera 232, the HMD 230, etc., as further described in detail below.

Figure 3A:
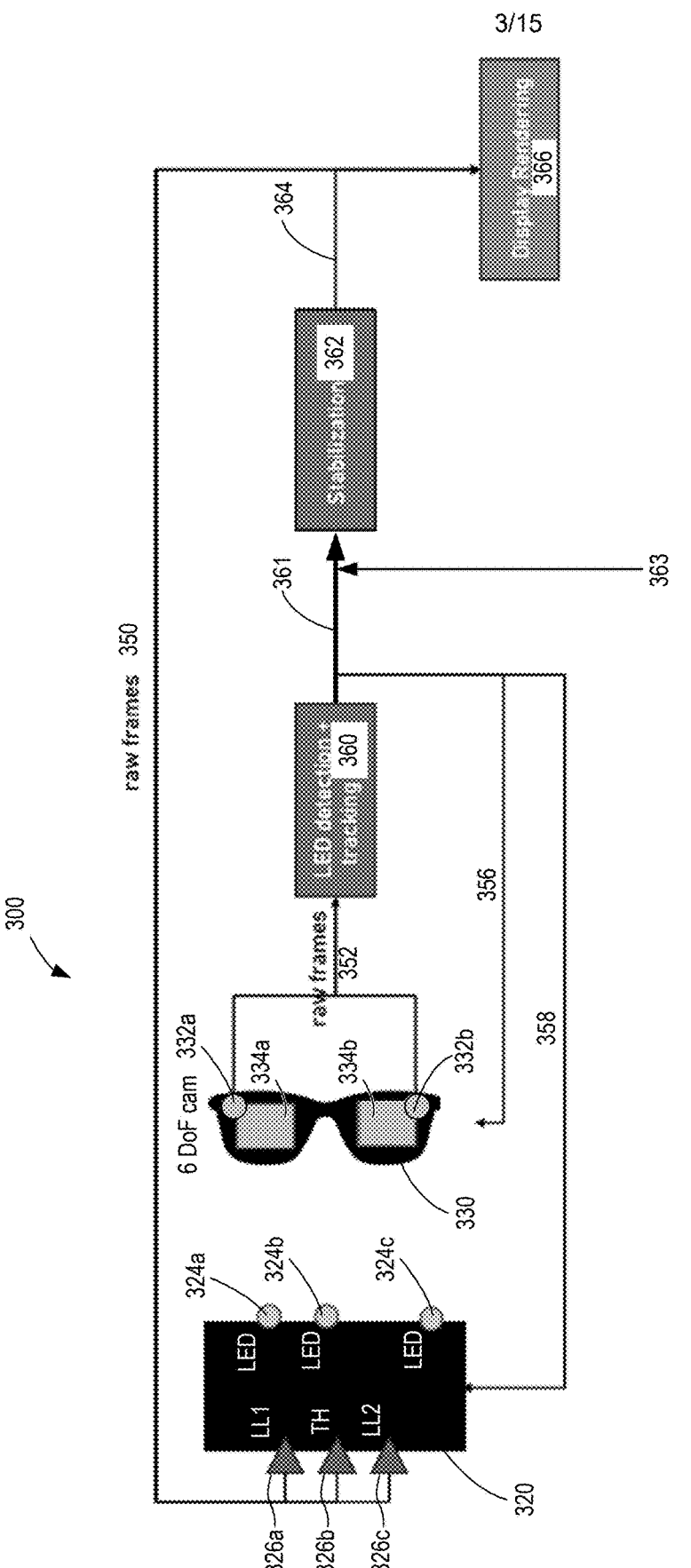
FIG. 3A provides a more detailed flow of data streams between a sensor hub, a HMD, and one or more processors of an alignment system, according to an embodiment.
Figure 3B:
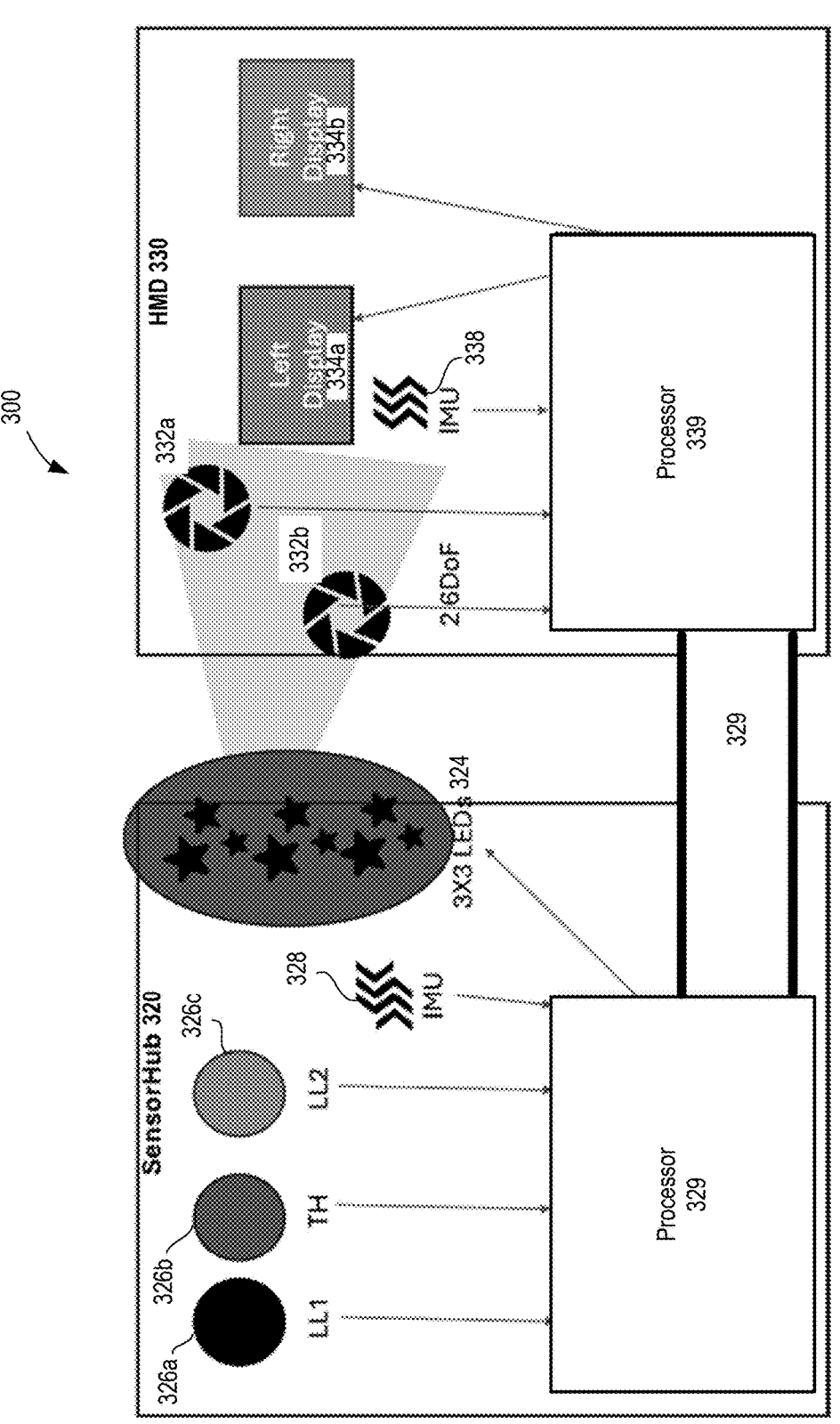
FIG. 3B schematically depicts the components of the system depicted in FIG. 3A.

FIG. 3A is a process flow diagram implementing an alignment system 300, according to an embodiment. FIG. 3B schematically depicts the alignment system 300. The alignment system 300 of FIGS. 3A and 3B can be structurally and/or functionally similar to the alignment system 200 of FIG. 2 and/or the alignment system 100 of FIG. 1. For example, the alignment system 300 can include a sensor hub 320 (e.g., structurally and/or functionally similar to the sensor hub 220 of FIG. 2 and/or the sensor hub 120 of FIG. 1) having sensors 326a, 326b, 326c (e.g., structurally and/or functionally similar to the sensors 226 of FIG. 2 and/or the sensors 126 of FIG. 1) and LEDs 324a, 324b (e.g., structurally and/or functionally similar to the LEDs 224a, 224b of FIG. 2 and/or the light sources 124 of FIG. 1). Further, the alignment system 300 can include a HMD 330 (e.g., structurally and/or functionally similar to the HMD 230 of FIG. 2 and/or the HMD 130 of FIG. 1) having cameras 332a, 332b (e.g., structurally and/or functionally similar to the camera 232 of FIG. 2 and/or the camera 132 of FIG. 1) and display screens 334a, 334b (e.g., structurally and/or functionally similar to the display screens 234 of FIG. 2 and/or the display screen 134 of FIG. 1). In FIGS. 3A and 3B, the cameras 332a, 332b can be 6DOF cameras. The cameras 332a, 332b can be configured to capture images of a portion of an environment near the alignment system 300 from a first perspective. Further, the sensor 326a can be a low light (LL) camera, the sensor 326b can be a thermal (TH) camera, and the sensor 326c can be another LL camera. The sensors 326a, 326b, 326c can be configured to capture data (e.g., images) of another portion of the environment near the alignment system 300 from a second perspective.

As shown in FIG. 3B, the sensor hub 320 can include an IMU 328 configured to determine, gather, or otherwise communicate position information, motion data, etc., of the sensor hub 320. Further, as shown in FIG. 3B, the HMD 330 can include an IMU 338 configured to determine, gather, or otherwise communicate position information, motion data, etc., of the HMD 330. The sensor hub 320 can include a processor 329 configured to receive images from at least one of the sensors 326a, 326b, 326c, position information from the IMU 328, and/or motion data from the IMU 328. Further, the processor 329 can be configured to transmit signals to the LEDs 324a, 324b, 324c (e.g., to initiate activation of the LEDs 324a, 324b, 324c according to their respective predetermined sequences). The HMD 330 can include a processor 339 configured to receive images from at least one of the cameras 332a, 332b, position information from the IMU 338, and/or motion data from the IMU 338. Further, the processor 339 can be configured to transmit signals to the displays 334a, 334b (e.g., to cause display of the images). The processor 339 may be operably coupled to the processor 329 to permit or enable data transmissions therebetween, as described in detail below.

As shown in FIG. 3A, the alignment system 300 can cause the cameras 332a, 332b to capture a first set of images 352 (also referred to herein as "raw frames"). The raw frames 352 can include a first portion of an environment (e.g., from a first perspective) of the alignment system 300 as well as at least a portion of the LEDs 324a, 324b, 324c on the sensor hub 320. The alignment system 300 can cause transmission of the set of images to the processor 339 to perform LED detection and tracking (360). Additionally, or alternatively, the processor 339 can access the set of images to identify the LEDs 324a, 324b, 324c (e.g., based on their respective predetermined sequences). Further, the alignment system 300 can cause the sensors 326a, 326b, 326c to capture a second set of images 350 (also referred to herein as "raw frames"). The raw frames 350 can include a second portion of the environment (e.g., from a second perspective).

In some implementations, the alignment system 300 can cause the processor 339 to transmit a signal (356) to the HMD 330 to adjust the cameras 332a, 332b and/or the displays 334a, 334b. For example, the signal (356) can include instructions to cause the cameras 332a, 332b to change a framerate, change an exposure level, capture another set of images, etc. Further, the alignment system 300 can cause the processor 339 to transmit a signal (358) to the sensor hub 320 (or the processor 329 of the sensor hub 320) to adjust the sensors 326a, 326b, 326c and/or the LEDs 324a, 324b, 324c. For example, the signal (358) can include instructions to change, initiate, prevent, activate, etc., the predetermined sequence associated with activating and/or illuminating at least one of the LEDs 324a, 324b, 324c. In some embodiments, the alignment system 300 can trigger each of the signals (356), (358) such that their instructions are executed by the processors 339, 329 respectively at substantially the same time. For example, the alignment system 300 can trigger each of the signals (356), (358) such that instructions to change an exposure duration of the cameras 332a, 332b are synced with instructions to initiate the predetermined sequences of the LEDs 324a, 324b, 324c, as further described in detail in connection with at least FIGS. 11A-11C.

At stabilization (362), the alignment system 300 can determine position information of the sensor hub 320 based on outputs from the LED detection and tracking (360) as well as other device parameters 363. The outputs from the LED detection and tracking (360) can include identification of each of the LEDs 324a, 324b, 324c and position information of the LEDs 324a, 324b, 324c. For example, the position information of the LEDs 324a, 324b, 324c can include positions of each LEDs 324a, 324b, 324c on the surface of the sensor hub 320, distances between the LEDs 324a, 324b, 324c and the cameras 332a, 332b, etc. Other device parameters 363 can include (i) size and/or shape of the sensor hub 320, HMD 330, the LEDs 324a, 324b, 324c, cameras 332a, 332b, and/or sensors 326a, 326b, 326c, (ii) intrinsic parameters (e.g., focal length, principal point, skew, pixel size, lens distortion, etc.) of the LEDs 324a, 324b, 324c, cameras 332a, 332b, and/or sensors 326a, 326b, 326c, and/or (iii) extrinsic parameters (e.g., position and orientation in a 3D world coordinate system) of the LEDs 324a, 324b, 324c, the cameras 332a, 332b, and/or the sensors 326a, 326b, 326c. In some implementations, the other device parameters 363 includes position information and/or motion data from at least one of the IMUs 328, 338.

At display rendering (366), the alignment system 300 can modify the raw frames 350 based at least in part on the position information of the sensor hub 320 to produce a modified set of frames showing the second portion of the environment (as depicted in the raw frames 350) modified to be from the first perspective of the cameras 332a, 332b. For example, the alignment system 300 can determine a transformation function that modifies the image data captured from the second perspective (of the sensors 326a, 326b, 326c) to be from the first perspective (of the cameras 332a, 332b) and use the transformation function to modify the raw frames 350 to produce the modified set of frames. In some implementations, the alignment system 300 can generate a combined frame (or a set of combined frames) from the raw frames 352 and the modified set of frames. In turn, the alignment system 300 can cause display of the modified set of frames or the set of combined frames to the display screens 334a, 334b of the HMD 330. In this way, instead of seeing two sets of images from two sets of devices (e.g., sensors 326a, 326b, 326c and the cameras 332a, 332b) from two perspectives, the user of the HMD 330 can see one set of images (e.g., the set of combined frames or the modified set of frames) from two sets of devices from one perspective, which is more easily discernable and less disruptive to the user experience.

Figure 4A:
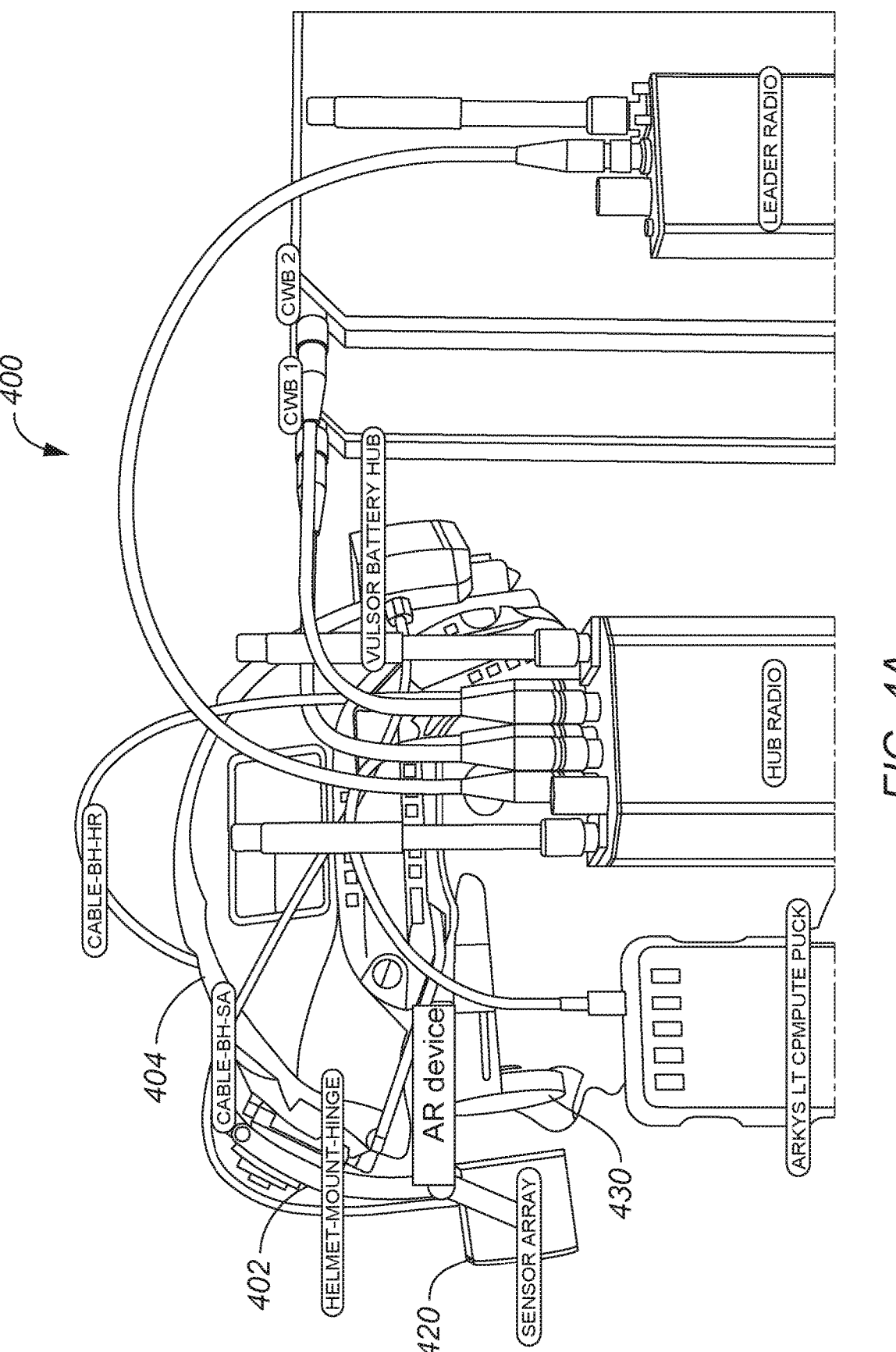
FIGS. 4A and 4B depict an example of a system including a modular sensor hub that is detachably couplable to a HMD, according to an embodiment.
Figure 4B:
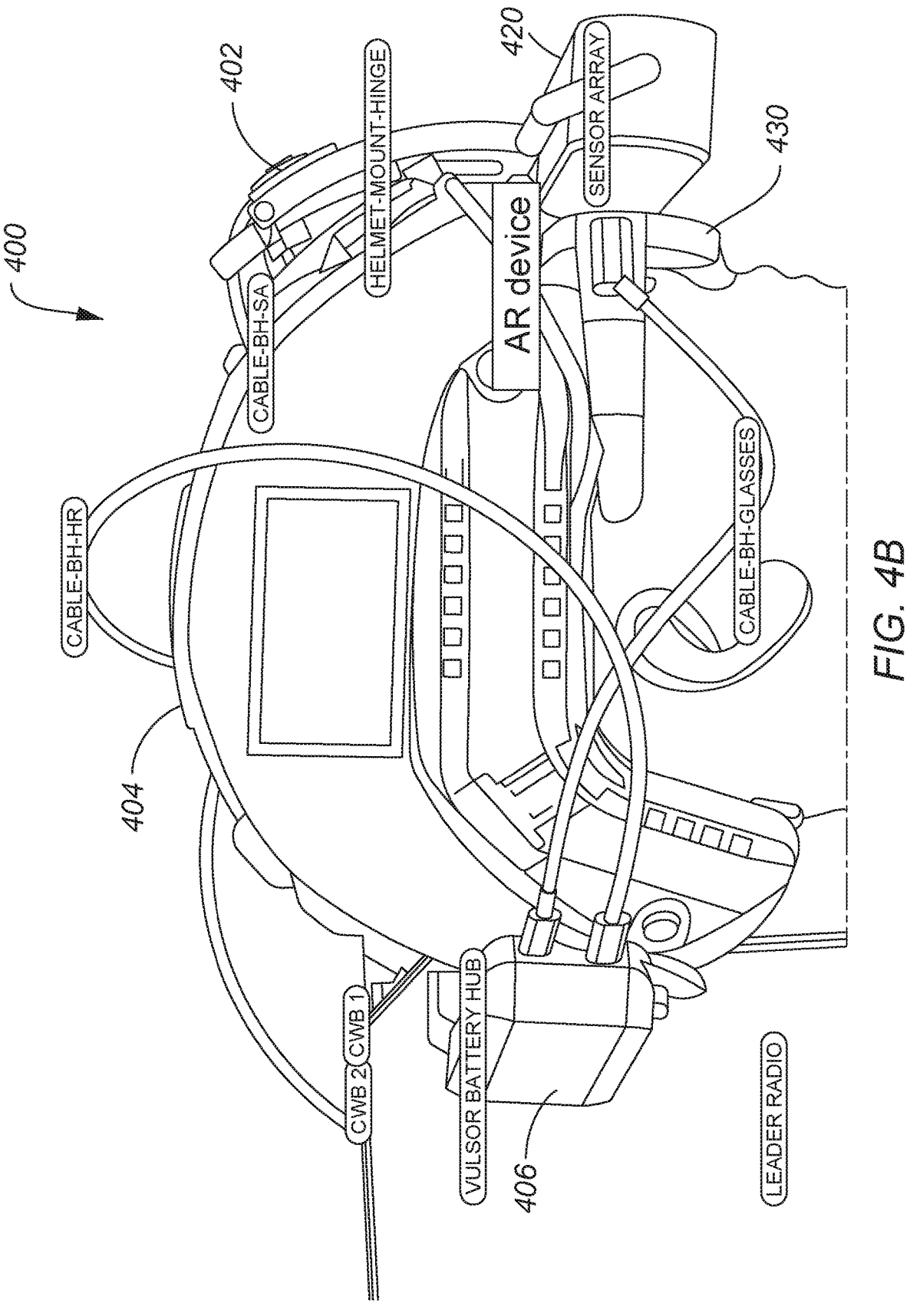

FIGS. 4A and 4B show an example implementation of a system 400 that includes a HMD 430 and a sensor hub 420, according to an embodiment. The system 400 of FIGS. 4A and 4B is structurally and/or functionally similar to the system 100 of FIG. 1, the system 200 of FIG. 2, and/or the system 300 of FIGS. 3A and 3B. For example, the system 400 of FIGS. 4A and 4B can include a HMD 430 (e.g., structurally and/or functionally similar to the HMD 130 of FIG. 1, the HMD 230 of FIG. 2, and/or the HMD 330 of FIGS. 3A and 3B), a sensor hub 420 (e.g., structurally and/or functionally similar to the sensor hub 120 of FIG. 1, the sensor hub 220 of FIG. 2, and/or the sensor hub 320 of FIGS. 3A and 3B), and a connector 402 (e.g., structurally and/or functionally similar to the connector 202 of FIG. 2). The system 400 can include a helmet 404, which can house a processor, circuitry, and/or other components of the system 400. The sensor hub 420 and the HMD 430 may not be disposed on a unitary rigid structure, such that the sensor hub 420 can be displaceable relative to the HMD 430. For example, the sensor hub 420 can be attachable to and/or detachable from the helmet 404, e.g., via the connector 402. In some embodiments, the connector 402 is configured to mechanically couple the sensor hub 420 to the helmet 404. In some embodiments, the connector 402 includes a hinge configured to enable the sensor hub 420 to be rotated relative to the HMD 430, e.g., to move the sensor hub 420 out of view when not needed. The HMD 430 can be separate from the helmet 404, e.g., worn as a pair of glasses. In some implementations, the HMD 430 is integral to or disposed on the helmet 404; however, the hinged coupling of the sensor hub 420 can still lead to movement between the sensor hub 420 and the HMD 430. The sensor hub 420 and the HMD 430 can be coupled to a housing 406, e.g., via wired connections, that is configured to be disposed behind a head of the user when worn.

Figure 5:
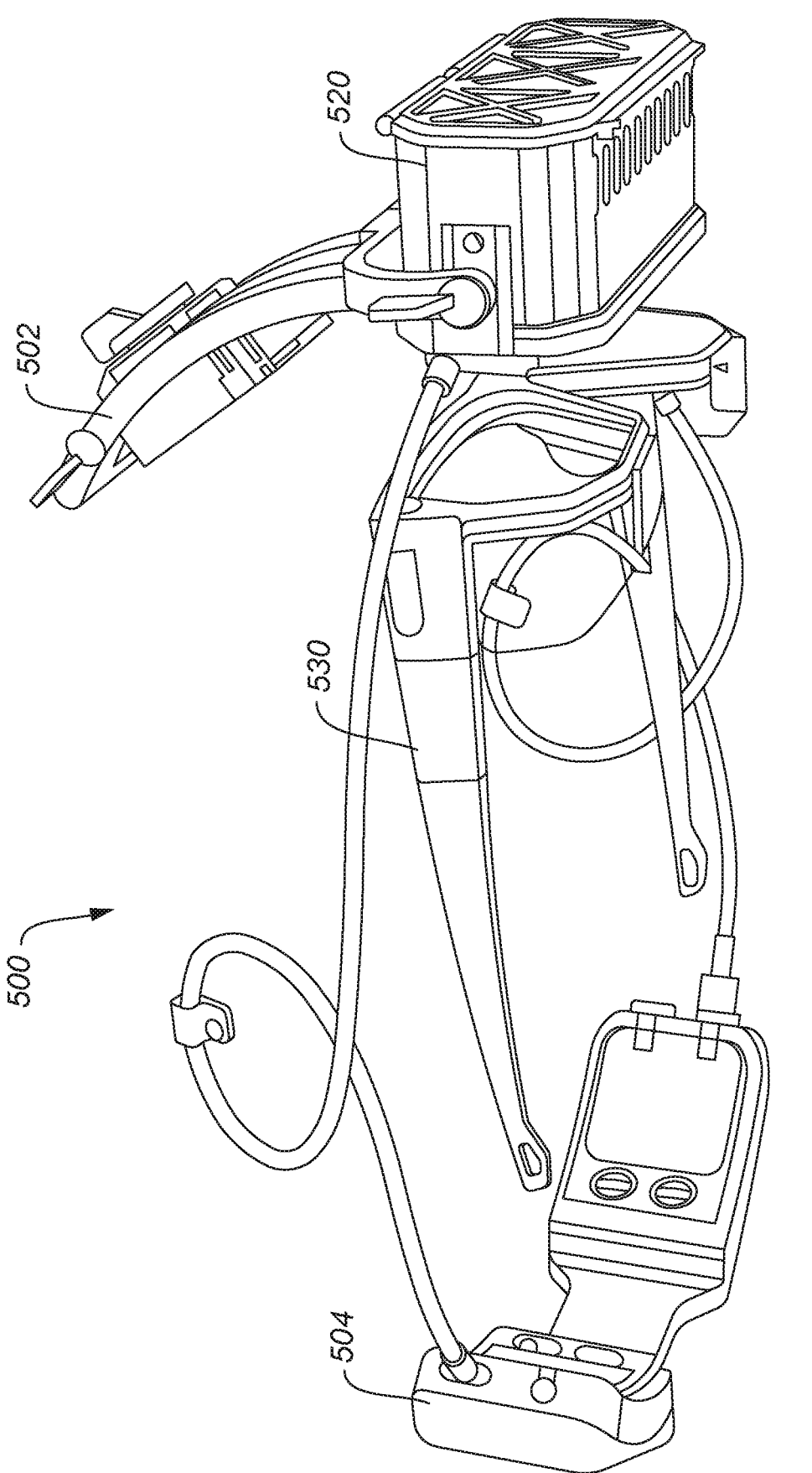
FIG. 5 depict another example of a system including a modular sensor hub that is detachably couplable to a HMD, according to an embodiment.

FIG. 5 shows an example implementation of a system 500 that includes a HMD 530 and a sensor hub 520, according to an embodiment. The system 500 of FIG. 5 is structurally and/or functionally similar to the system 100 of FIG. 1, the system 200 of FIG. 2, the system 300 of FIGS. 3A and 3B, and/or the system 400 of FIGS. 4A and 4B. For example, the alignment system 500 of FIG. 5 can include a HMD 530 (e.g., structurally and/or functionally similar to the HMD 130 of FIG. 1, the HMD 230 of FIG. 2, the HMD 330 of FIGS. 3A and 3B, and/or the HMD 430 of FIGS. 4A and 4B), a sensor hub 520 (e.g., structurally and/or functionally similar to the sensor hub 120 of FIG. 1, the sensor hub 220 of FIG. 2, the sensor hub 320 of FIGS. 3A and 3B, and/or the sensor hub 420 of FIGS. 4A and 4B), and a connector 502 (e.g., structurally and/or functionally similar to the connector 202 of FIG. 2 and/or the connector 402 of FIGS. 4A and 4B). Similar to the system 400, the system 500 can include a HMD 530 that is implemented as glasses, and a sensor hub 520 that is disposed relative to the HMD 530. The sensor hub 520 can be configured to couple to any head-worn device, such as a helmet, a hat, a frame, etc. As shown, the sensor hub 520 can be operatively coupled to electronics (e.g., circuitry, processor, etc.) and/or a power source that is disposed in a housing 504, e.g., via a wired connection (or alternatively, a wireless connection). When the sensor hub 520 is coupled to a head of a user, the sensor hub 520 can be disposed in front of a head of the user while the housing 504 can be situated behind a head of the user. Such can reduce obstruction and/or weight toward a front of the head.

Similar to the system 400, the HMD 530 of system 500 can be separate from the sensor hub 520. Unlike system 500, however, the HMD 530 is not coupled via a wired connection to the housing 504. In some implementations, the HMD 530 can be operatively coupled, e.g., via a wireless connection, to the electronics disposed in the housing 504. In other implementations, the HMD 530 is not coupled to the electronics disposed in the housing 504 but can include onboard electronics and/or a power source. A processor (e.g., processor 110) operatively couplable to the sensor hub 520 and the HMD 530 can then be configured to algin image data captured by sensor(s) of the sensor hub 520 with image data captured by the HMD 530.

Figure 6A:
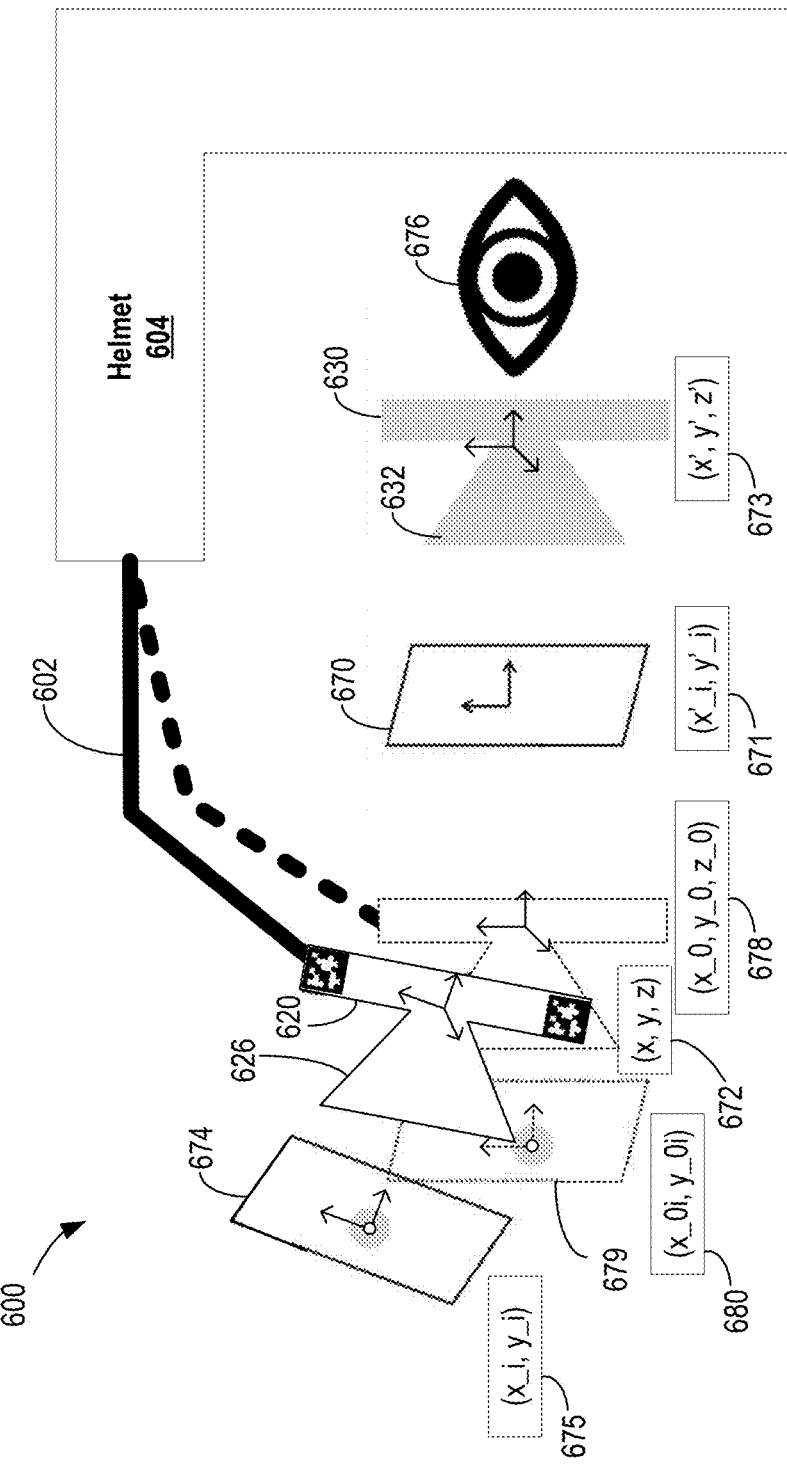
FIG. 6A schematically depicts coordinates of components of a system including a modular sensor hub that is detachably couplable to a HMD, showing coordinates of image frames captured by the sensor hub and the HMD, according to an embodiment.
Figure 6B:
FIG. 6B is a flow diagram showing processing performed by an alignment system to align image frames captured by the sensor hub with image frames captured by the HMD of FIG. 6A, according to an embodiment.

FIG. 6A schematically depicts coordinates of various elements (e.g., HMD, sensor hub, and/or image frames captured by the HMD and the sensor hub) associated with an alignment system 600, according to an embodiment. FIG. 6B is a flow diagram showing processing performed by the alignment system 600 of FIG. 6A. The alignment system 600 of FIG. 6A is structurally and/or functionally similar to the system 100 of FIG. 1, the system 200 of FIG. 2, the system 300 of FIGS. 3A and 3B, the system 400 of FIGS. 4A and 4B, and/or the system 500 of FIG. 5. For example, the alignment system 600 can include a helmet 604 (e.g., structurally and/or functionally similar to the helmet 404 of FIGS. 4A and 4B), a HMD 630 (e.g., structurally and/or functionally similar to the HMD 130 of FIG. 1, the HMD 230 of FIG. 2, the HMD 330 of FIGS. 3A and 3B, the HMD 430 of FIG. FIGS. 4A and 4B, and/or the HMD 530 of FIG. 5), a camera 632 (e.g., structurally and/or functionally similar to the camera 132 of FIG. 1, the camera 232 of FIG. 2, and/or the cameras 332a, 332b of FIGS. 3A and 3B), a sensor hub 620 (e.g., structurally and/or functionally similar to the sensor hub 120 of FIG. 1, the sensor hub 220 of FIG.

2, the sensor hub 320 of FIGS. 3A and 3B, the sensor hub 420 of FIG. FIGS. 4A and 4B, and/or the sensor hub 520 of FIG. 5), a sensor 626 (e.g., structurally and/or functionally similar to the sensors 126 of FIG. 1, the sensor 226 of FIG. 2, and/or the sensors 326a, 326b, 326c of FIGS. 3A and 3B), and a connector 602 (e.g., structurally and/or functionally similar to the connector 202 of FIG. 2, the connector 402 of FIGS. 4A and 4B, and/or the connector 502 of FIG. 5). As shown in FIG. 6A, the sensor hub 620 is displaceable relative to the HMD 630. In the examples described in FIGS. 6A and 6B, the sensor hub 620 can include any of the light sources or fiducials described herein. For purposes of explanation, however, the sensor hub 620 includes fiducials positioned on a surface of the sensor hub 620 at a location that can be captured by the HMD 630.

The alignment system 600 can cause the camera 632 to capture a first image of a first portion of the environment and a portion of the sensor hub 620 from a first perspective 670. The first image can include at least some of the fiducials positioned on the surface of the sensor hub 620 facing the HMD 630. The first perspective 670 can define a first coordinate reference position 671 aligned with a field of view of the camera 632. The alignment system 600 can determine position information 672 of the sensor hub 620 based on at least the first image. For example, the alignment system 600 can determine the position information 672 of the sensor hub 620 based on at least one of (i) position(s) of the fiducials as captured in the first image, (ii) the first coordinate reference position 671, or (iii) intrinsic parameters 673 of the camera 632 (e.g., camera intrinsics, such as, focal length, pixel size, etc.). As previously mentioned, intrinsic parameters 673 such as focal length, principal point, skew, pixel size, lens distortion, etc., that can affect the first coordinate reference position 671, for example. As shown in FIG. 6B, the alignment system 600 can utilize the first coordinate reference position 671 and the intrinsic parameters 673 to output the position information 672 of the sensor hub 620.

The alignment system 600 can cause the sensor 626 of the sensor hub 620 to capture a second image of a second portion of the environment from a second perspective 674. The second perspective 674 can define a second coordinate reference position 675 aligned with a field of view of the sensor 626. As shown in FIG. 6A, the second perspective 674 is skewed relative to the first perspective 670. In some embodiments, movement of the sensor hub 620 relative to the HMD 630 (e.g., caused by the user, the environment, etc.) can cause the second perspective 674 to be skewed relative to the first perspective 670. Because the sensor hub 620 can be supported in a movable manner, image data captured by the sensor hub 620, especially in rugged environments, can have significant camera motion that can be confusing, disruptive, annoying, etc., if presented directly to a user. Moreover, if the sensor hub 620 were to move relative to the HMD 630 such that the perspective of the sensor hub 620 shifts relative to a perspective of the HMD 630, then presentation of any image data captured by the sensor hub 620 can also lead to confusion, disruptiveness, motion sickness, etc., because the first perspective 670 of the HMD 630 and the second perspective 674 of the sensor hub 620 capture different views and/or portions of the environment. To resolve this, the alignment system 600 can modify the second image (e.g., image(s) captured by the sensor hub 620) based at least in part on the position information 672 of the sensor hub 620 to produce a modified second image showing the second portion of the environment but modified to be from the first perspective 670 of the HMD 630. In some embodiments, the alignment system 600 can produce the modified second image by determining modified position information 678 of the sensor hub 620 such that a third perspective 679 of the sensor 626 aligns with the first perspective 670. The third perspective 679 can define a third coordinate reference position 680 that is aligned with (e.g., and spaced apart from) the first coordinate reference position 671. As shown in FIG. 6B, the alignment system 600 can utilize the second coordinate reference position 675, the position information 672 of the sensor hub 620, and the intrinsic parameters 673 of the sensor hub 620 (e.g., camera intrinsics, such as, focal length, pixel size, etc.) to (i) determine the modified position information 678 of the sensor hub 620 and (ii) produce a modified second image at the third coordinate reference position 680. In some implementations, modifying of the second image can include warping the second perspective 674 (e.g., to match or align with the first perspective 670). In some implementations, the modification can be implemented using a transformation. In some implementations, the alignment system 600 can determine the modified position information 678 and/or produce the modified second image further based on intrinsic parameters of the sensor 626.

Figure 7A:
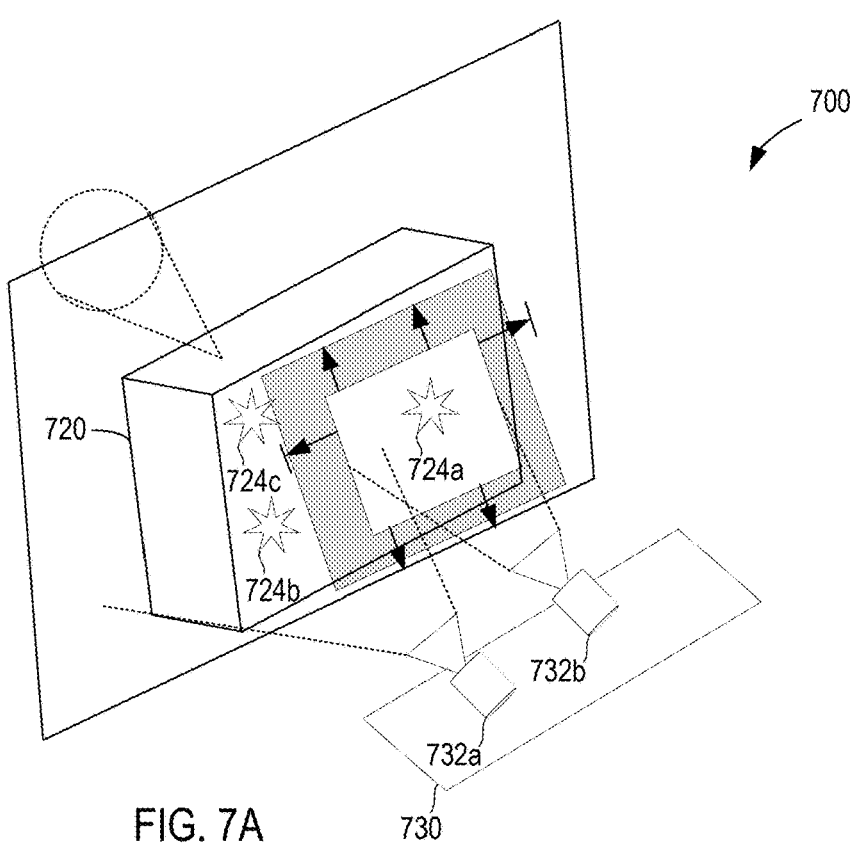
FIG. 7A schematically depicts a field of view of a HMD with respect to a sensor hub, according to an embodiment.

FIG. 7A shows an alignment system 700, according to an embodiment. The alignment system 700 of FIG. 7A is structurally and/or functionally similar to the system 100 of FIG. 1, the system 200 of FIG. 2, the system 300 of FIGS. 3A and 3B, the system 400 of FIGS. 4A and 4B, the system 500 of FIG. 5, and/or the system 600 of FIGS. 6A and 6B. For example, the alignment system 700 can include a HMD 730 (e.g., structurally and/or functionally similar to the HMD 130 of FIG. 1, the HMD 230 of FIG. 2, the HMD 330 of FIGS. 3A and 3B, the HMD 430 of FIG. FIGS. 4A and 4B, the HMD 530 of FIG. 5, and/or the HMD 630 of FIG. 6A), cameras 732a, 732b (e.g., structurally and/or functionally similar to the camera 132 of FIG. 1, the camera 232 of FIG. 2, the cameras 332a, 332b of FIGS. 3A and 3B, and/or the camera 632 of FIG. 6A), a sensor hub 720 (e.g., structurally and/or functionally similar to the sensor hub 120 of FIG. 1, the sensor hub 220 of FIG. 2, the sensor hub 320 of FIGS. 3A and 3B, the sensor hub 420 of FIG. FIGS. 4A and 4B, the sensor hub 520 of FIG. 5, and/or the sensor hub 620 of FIG. 6A), and light sources 724a, 724b, 724c (e.g., structurally and/or functionally similar to the light sources 124 of FIG. 1, the LEDs 224a, 224b of FIG. 2, the LEDs 324a, 324b, 324c of FIGS. 3A and 3B). As shown in FIG. 7A, the camera 732a can capture of field of view that is different from but overlaps a field of view of the camera 732b. In some implementations, the cameras 732a, 732b capture a portion of the sensor hub 720. In such implementations, the camera 732a, 732b may track, monitor, and/or identify one of the LEDs (e.g., the LED 724a). The alignment system 700 can adjust the parameters and/or position of the cameras 732a, 732b to capture more or less of the sensor hub 720 (e.g., to capture more or less of the LEDs 724a, 724b, 724c). In some implementations, the alignment system 700 can identify each of the LEDs 724, e.g., based on uniquely associated patterns of activating each LED 724, to determine the position information of the sensor hub 720 and, subsequently, produce a modified image of one or more images captured by the sensor hub 720. In some implementations, the alignment system 700 can identify any number of the LEDs 724 (e.g., two, three, etc.) to determine the position information of the sensor hub 720 and, subsequently, produce the modified image.

Figure 7B:
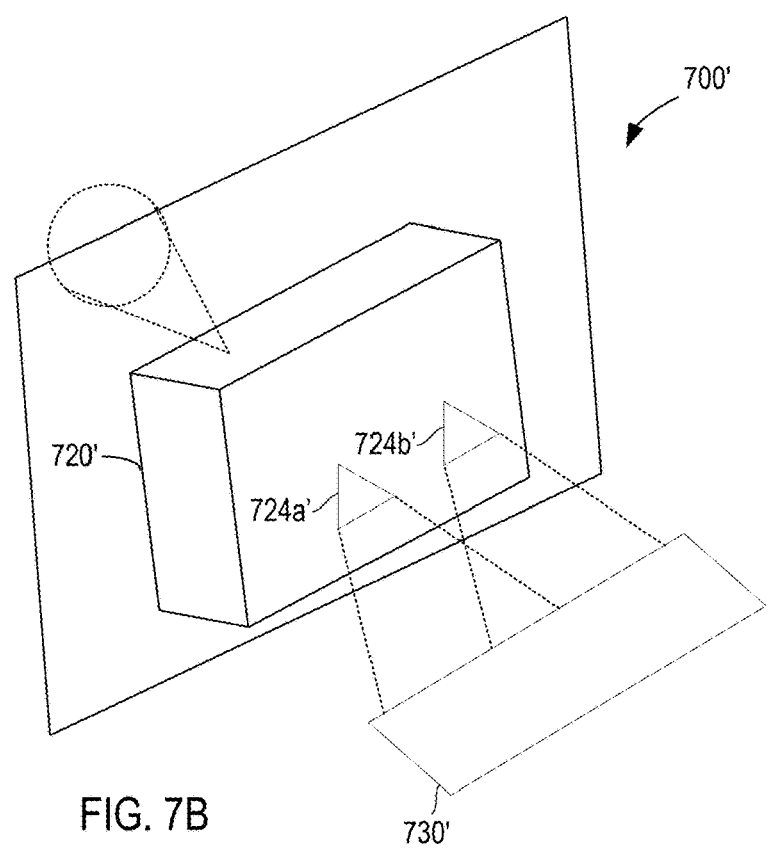
FIG. 7B schematically depicts one or more light sources disposed on a sensor hub emitting light toward a HMD, according to an embodiment.

FIG. 7B is another implementation of the alignment system 700', according to embodiments. In some embodiments, the alignment system 700' produces the modified image based on image data captured of the HMD 730' and the face of the user. In such embodiments, the cameras 724a', 724b' may be disposed on a sensor hub 720', and the cameras 724a', 724b' can be used to capture one or more views of the HMD 730' and the face of the user. A processor (e.g., processor 110) may be configured to receive the image data and to distinguish the face from the HMD 730', e.g., using one or more algorithms, machine learning models, etc. In particular, the processor may be configured to determine a perspective of the user based on the position of the HMD 730'. The processor can cause the cameras 724a', 724b' and/or one or more light sources to illuminate the face and/or HMD 730' periodically, randomly, etc. to track a position of the sensor hub 720' relative to the HMD 730'.

Figure 8:
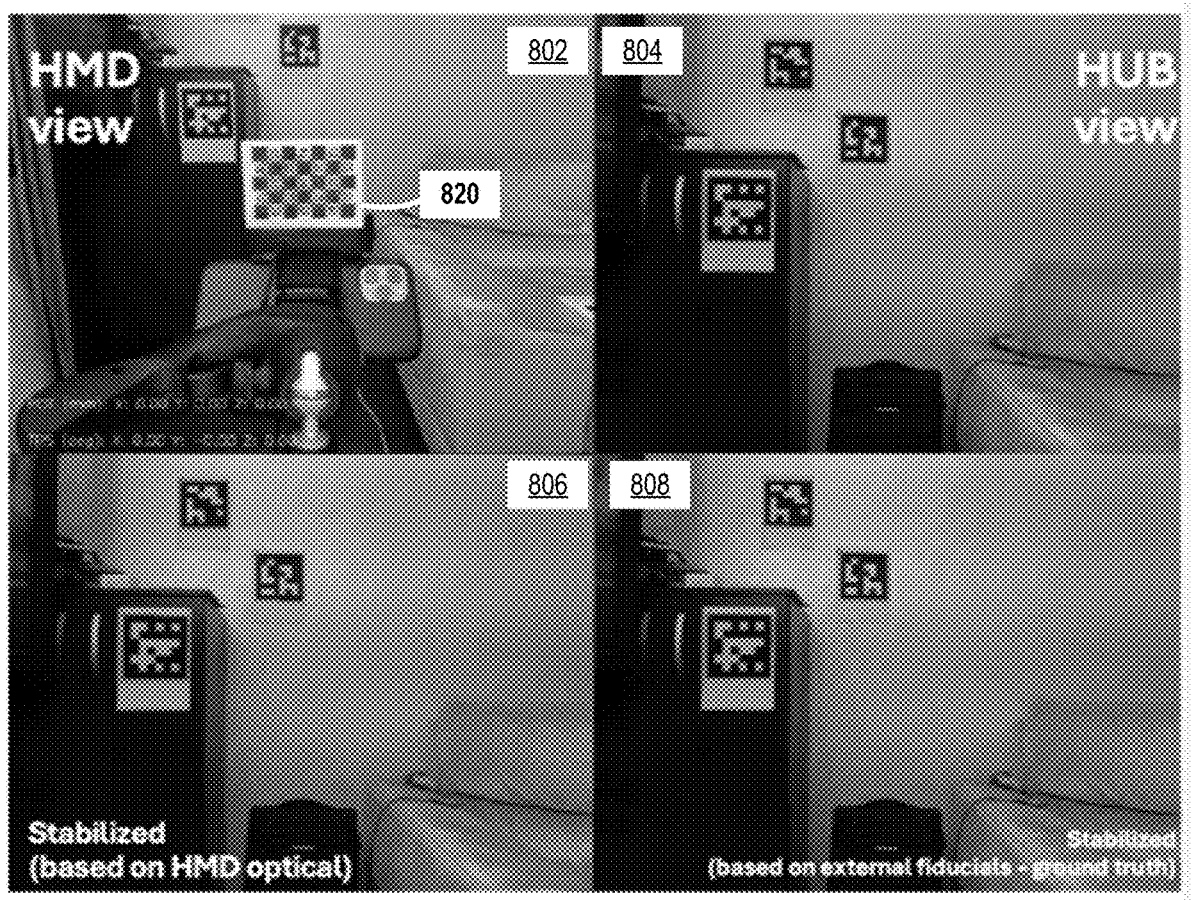
FIG. 8 depicts an example of video passthrough using an alignment system, according to an embodiment.

FIG. 8 shows images of how alignment methods as described herein can be used to represent a scene or view of an environment, according to an embodiment. In FIG. 8, a sensor hub 820 can have sensors (e.g., cameras) that capture a portion of an environment. The sensor hub 820 can be structurally and/or functionally similar to the sensor hub 120 of FIG. 1, the sensor hub 220 of FIG. 2, the sensor hub 320 of FIGS. 3A and 3B, the sensor hub 420 of FIGS. 4A and 4B, the sensor hub 520 of FIG. 5, sensor hub 620 of FIG. 6A, and/or the sensor hub 720 of FIG. 7A. The sensor hub 820 can include fiducials (e.g., structurally and/or functionally similar to the fiducials 122 of FIG. 1) on a surface of the sensor hub 820. In the example of FIG. 8, the surface of the sensor hub 820 having the fiducials is facing a user or HMD. The fiducials exhibit a generally grid-like or checkerboard pattern.

In 802, an image captured by the HMD (not depicted in FIG. 8) is shown. This image includes a portion of the environment and the fiducials of the sensor hub 820. In 804, an image captured by the sensor hub is shown. This image includes a portion of the environment, however, from a perspective that is different from the perspective of the HMD, as shown in 802. In 806, using the methods described herein, the image captured by the sensor hub is modified to be from the perspective of the HMD. The image in 806 provides the user with an unobstructed view of the environment (e.g., a view that is not obstructed by the sensor hub 820 and/or cables, support structure, coupling element, etc. attached thereto). To prove the performance of the alignment methods disclosed herein, a separate image 808 of the environment is shown next to the image 806, which shows the image captured by the sensor hub adjusted based on the fiducials that in the environment. As shown, the image 806 has close likeness to the image 808, therefore demonstrating that the alignment methods disclosed herein are effective and accurate at modifying image data captured by a sensor hub. These fiducials in the environment were included in the test environment, for validating the performance of the alignment methods disclosed herein. In a field setting, these types of environmental fiducials would not be present, and therefore, systems and devices such as those described here would rely on methods, such as the alignment methods disclosed here, to modify images that are captured by sensor hubs.

Figure 9:
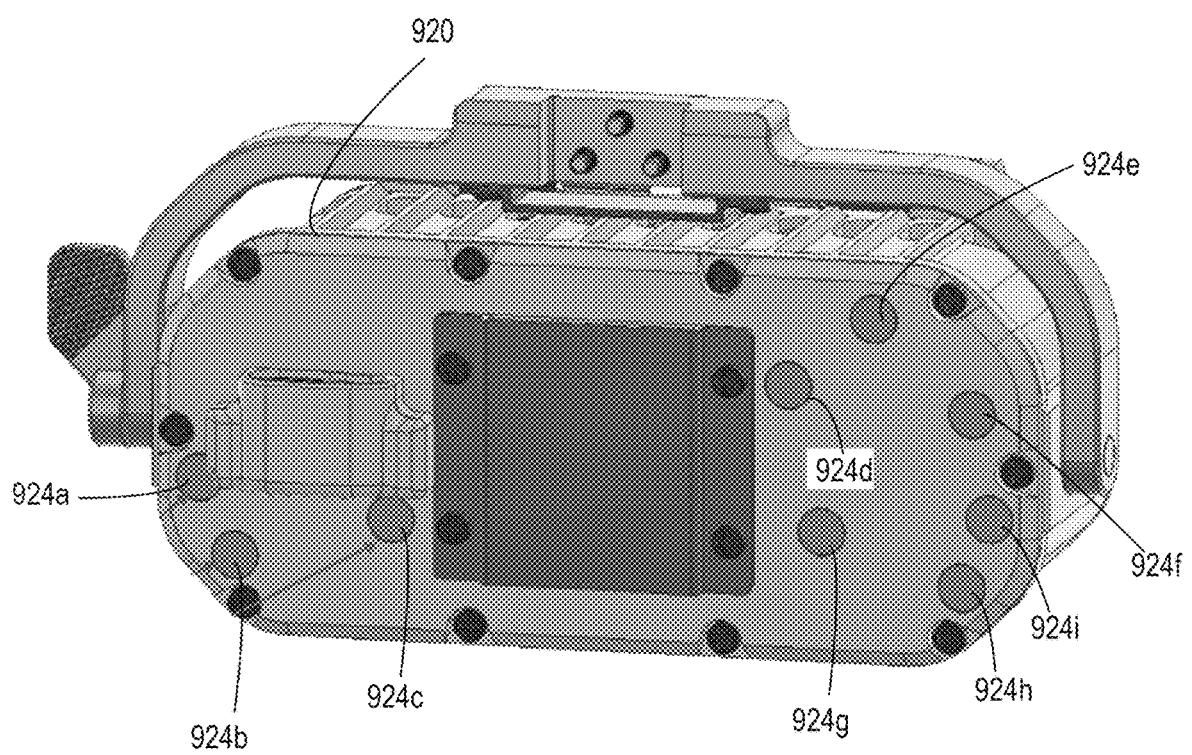
FIG. 9 shows a sensor hub with one or more illuminated points, according to an embodiment.

FIG. 9 shows a sensor hub 920, according to an embodiment. The sensor hub 920 can be structurally and/or functionally similar to the sensor hub 120 of FIG. 1, the sensor hub 220 of FIG. 2, the sensor hub 320 of FIGS. 3A and 3B, the sensor hub 420 of FIGS. 4A and 4B, the sensor hub 520 of FIG. 5, sensor hub 620 of FIG. 6A, the sensor hub 720 of FIG. 7A, and/or the sensor hub 820 of FIG. 8. The sensor hub 920 can include light sources 924a-924i (e.g., structurally and/or functionally similar to the light sources 124 of FIG. 1, the LEDs 224a, 224b of FIG. 2, the LEDs 324a, 324b, 324c of FIGS. 3A and 3B, and/or the light sources 724a, 724b, 724c of FIG. 7A). As shown, the light sources 924a-924i can be distributed across a surface of the sensor hub 920. In some implementations, the light sources 924a-924i are distributed in a pattern (e.g., a ring-like pattern) to define a constellation. In some implementations, the light sources 924a-924i are distributed randomly on the sensor hub 920.

Figure 10:
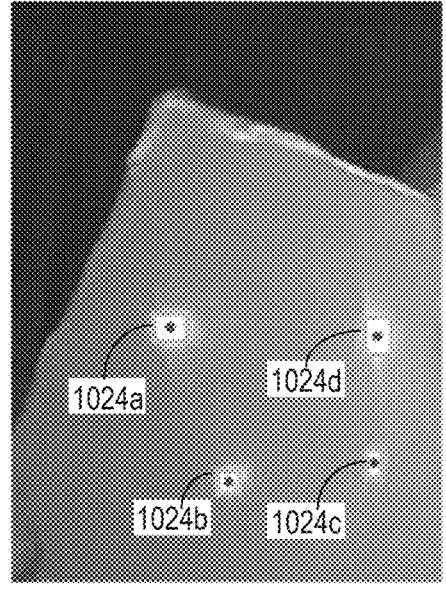
FIG. 10 shows illuminated points that can be included in a sensor hubs, according to an embodiment.

FIG. 10 depicts a view of light sources 1024a, 1024b, 1024c, 1024d, when activated, that is captured by a camera (e.g., a camera of a HMD) as described herein, according to embodiments. The light sources 1024a, 1024b, 1024c, 1024d are spaced apart from one another along a surface to form or define a constellation or other arrangement. As shown FIG. 10, the illumination points associated with the light sources 1024a, 1024b, 1024c, 1024d can be readily identified in the view (e.g., using algorithms such as object recognition, image segmentation, and/or other algorithms). The position of these illumination points can then be used to locate the sensor hub and modify the image captured by the sensor hub, as described herein.

Figure 11A:
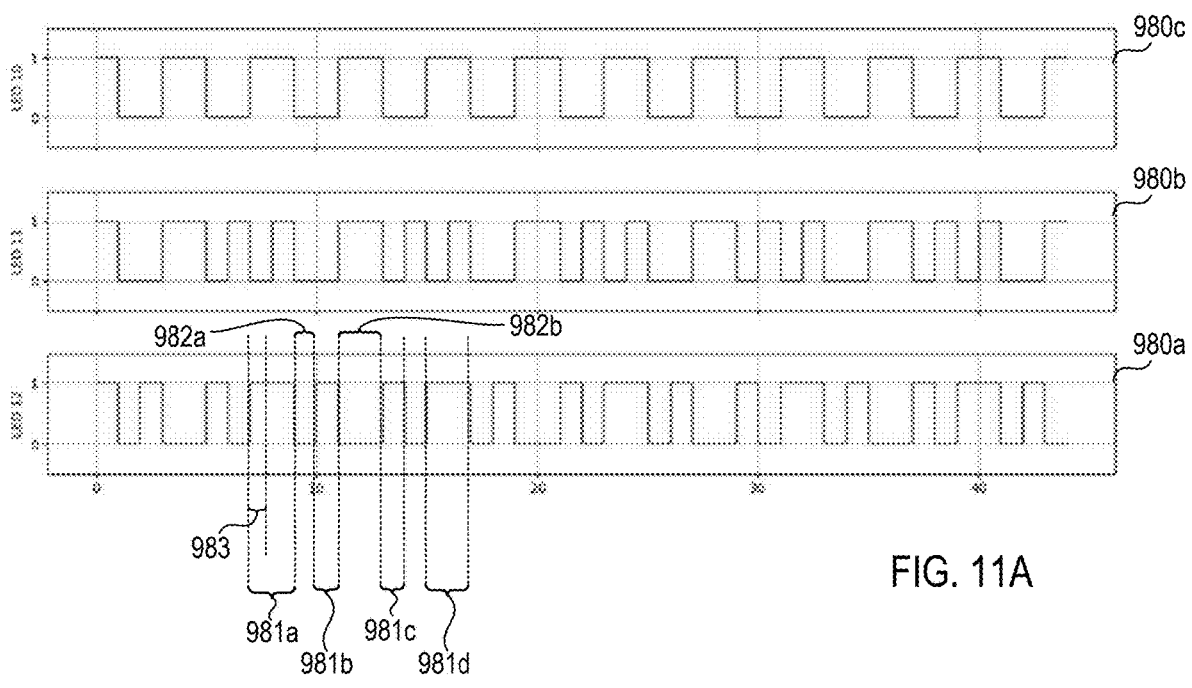
FIG. 11A shows plots that illustrate example light modulation sequences associated with illumination points of an alignment system, according to an embodiment.

FIG. 11A shows plots that illustrate LED modulation sequences 980a, 980b, 980c (also referred to herein as "sequences") associated with LEDs that can be implemented by any of the systems and devices described herein, according to an embodiment. The sequence 980a is uniquely associated with a first LED, the sequence 980b is uniquely associated with a second LED, and the sequence 980c is uniquely associated with a third LED. While three sequences are depicted, it can be appreciated that additional sequences (or less sequences) can be used by the systems and devices described herein. For example, in some implementations, a single sequence 980a can be used by each of the light sources. Alternatively, each sequence of a plurality of sequences 980a, 980b, etc. can be used by a subset of light sources. Other variations are also possible, to facilitate distinguishing between different light sources. The sequences 980a, 980b, 980c can modulate illumination levels of the first, second, and third LEDs respectively. For example, the sequence 980a can modulate the first LED over a period of time (e.g., 50 milliseconds (ms)) between a first luminance level (e.g., 1) and a second luminance level (e.g., 0). In the example of FIG. 11A, the first luminance level is greater than a predetermined threshold. For example, the first luminance level can be associated with a maximum luminance of the first LED. Further, the second luminance level can be associated with a minimum luminance of the first LED (e.g., off). The sequence 980a can define a set of luminance durations 981 for activating the first LED and a set of intervals 982 separating adjacent durations of the set of luminance durations 981. In some implementations, each luminance duration (e.g., the luminance duration 981a) of the set of luminance durations 981 is greater than a minimum period of time 983 used by (e.g., required for) the first LED, when activated, to reach the first luminance level. Similarly, the sequences 980b, 980c can define respective sets of luminance durations for activating the second LED and the third LED, respectively.

Figure 11B:
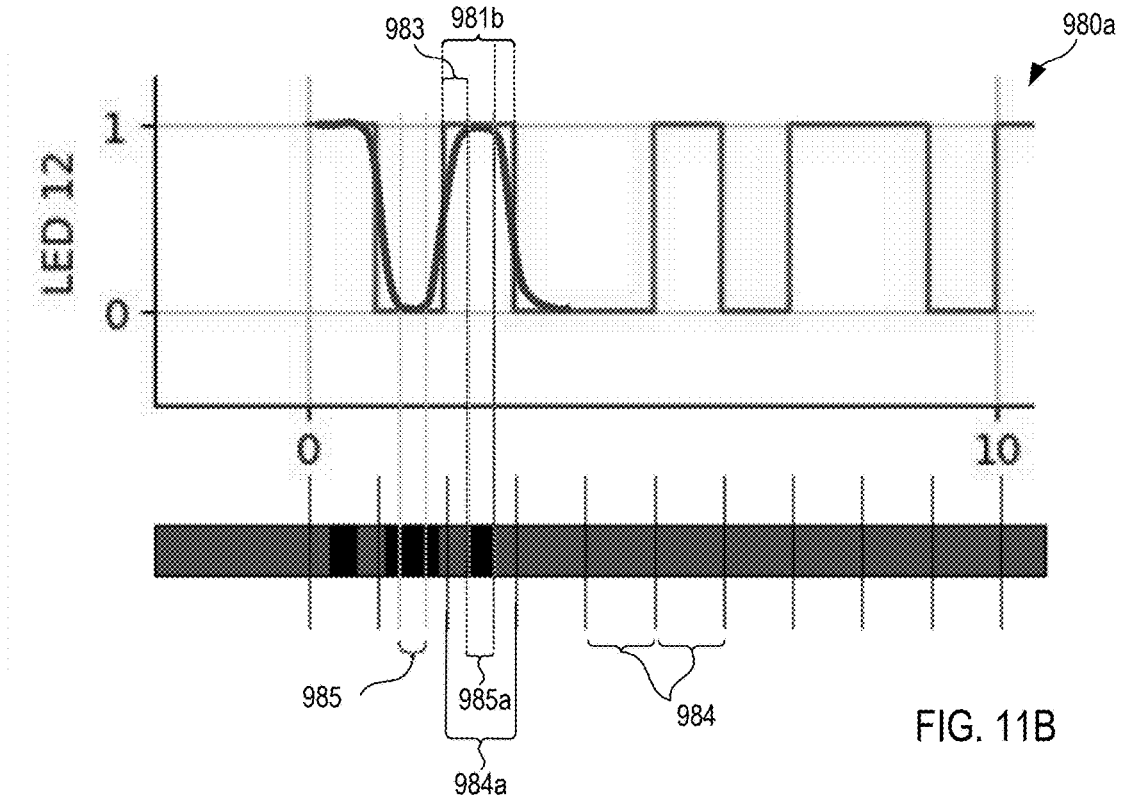
FIG. 11B shows a graph that illustrates the framerate of a camera with respect to a portion of a sequence of FIG. 11A, according to an embodiment.
Figure 11C:
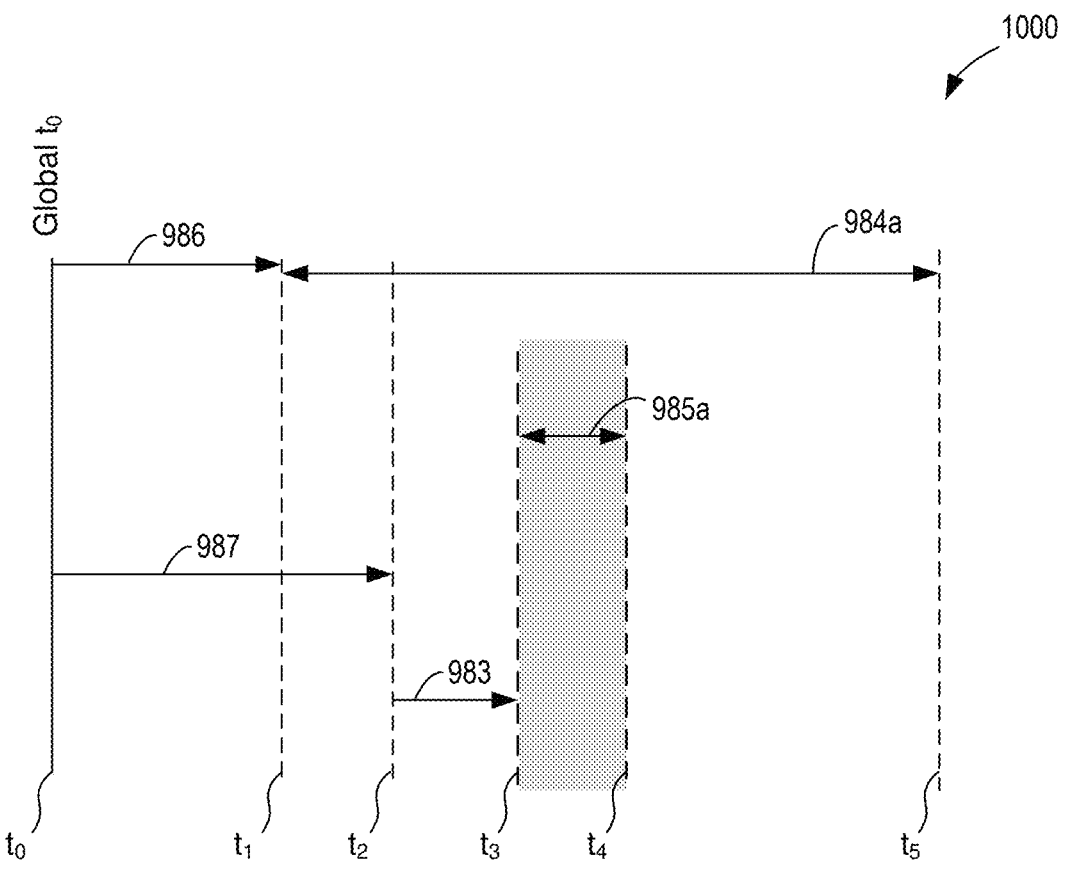
FIG. 11C illustrates an example synchronization scheme that can be implemented by an alignment system, according to an embodiment.

FIG. 11B shows a graph that illustrates the framerate of the camera 132 with respect to a portion of the sequence 980a of FIG. 11A, according to an embodiment. Although the examples of FIGS. 11A-11C are described in connection with the camera 132 and the sensor hub 120, any of the cameras or sensor hubs described herein can be implemented by the examples of FIG. 11B. In FIG. 11B, a frame duration 984a can correspond to a duration of time the camera 132 takes to capture a first image. Further, subsequent frame durations 984 can correspond to durations of time the camera 132 takes to capture subsequent images. Further, an exposure duration 985a can correspond to a duration of time during which a lens of the camera 132 is open (e.g., fully open). During the exposure duration 985a, the camera 132 enables an amount of light (e.g., above a predetermined light threshold) to pass through the lens. In some embodiments, an example alignment system (e.g., structurally and/or functionally similar to the alignment system 100 of FIG. 1, the alignment system 200 of FIG. 2, the alignment system 300 of FIGS. 3A and 3B, the alignment system 400 of FIGS. 4A and 4B, the alignment system 500 of FIG. 5, the alignment system 600 of FIG. 6A, and/or the alignment system 700 of FIGS. 7A and 7B) synchronizes the exposure durations 985 with the luminance durations 981. As shown in FIG. 11B, the exposure duration 985a approximately matches the luminance duration 981a. Further, the exposure duration 985a can be greater than the minimum period of time 983 such that the camera 132 can be fully exposed while the first LED is at peak brightness (e.g., above the predetermined threshold of luminance).

FIG. 11C illustrates an example synchronization scheme 1000 that can be implemented by any system or devices (e.g., alignment system 100, 200, etc.) described herein. For purposes of explanation, the synchronization scheme 1000 is described in connection with the examples of FIGS. 11A and 11B. An example alignment system can be configured to implement the synchronization scheme 1000 to align the exposure duration 985a with the luminance duration 981a. In particular, the alignment system can be configured to align a beginning of the exposure duration 985a with an end of the minimum period of time 983 that is takes for the first LED to exceed the luminance threshold. In other words, the alignment system can ensure that the camera 132 is fully exposed once the first LED reaches peak brightness, as described in detail below.

As shown in FIG. 11C, the alignment system transmits a first trigger signal to the camera 132 at time to. The first trigger signal can include instructions to initiate the capture of an image. In some embodiments, a time delay 986 defines a span of time between transmission of the first trigger signal at time to and frame initiation at the camera 132 (e.g., a beginning of the frame duration 984a) at time $t_1$. As previously mentioned, the exposure duration 985a can occur during the frame duration 984.

The alignment system can be configured to transmit a second trigger signal to the sensor hub 120 at time to. The second trigger signal can include instructions to initiate the sequence 980a (see FIGS. 11A and 11B). In some embodiments, a time delay 987 defines a span of time between transmission of the second trigger signal and receipt of the second trigger signal at the sensor hub 120 at time $t_2$. The sensor hub 120 can initiate the sequence 980a upon receipt of the second trigger signal (e.g., at time $t_2$). As previously mentioned, the first LED reaches peak brightness after the minimum period of time 983. At time $t_3$, the first LED is at peak brightness and the exposure duration 985a begins. At time $t_4$, the first LED begins to dim from its peak brightness and the exposure duration 985a ends. Accordingly, the alignment system can ensure that the exposure duration 985a is aligned with and spans a length of time associated with the peak brightness of the first LED. At time $t_5$, the frame duration 984a can end and another, subsequent frame duration 984 can begin. As such, the alignment system can repeat the synchronization scheme 1000 for subsequent frame durations 984, exposure durations 985, etc., such that at least a portion of the sequence 980a is recorded, tracked, monitored, captured, etc., by the camera 132. In some implementations, the alignment system can use the recorded sequence 980a to uniquely identify the first LED. In turn, the alignment system can determine position information of the sensor hub 120 based on identification and/or position information of the first, second, and/or third LEDs.

Figure 12:
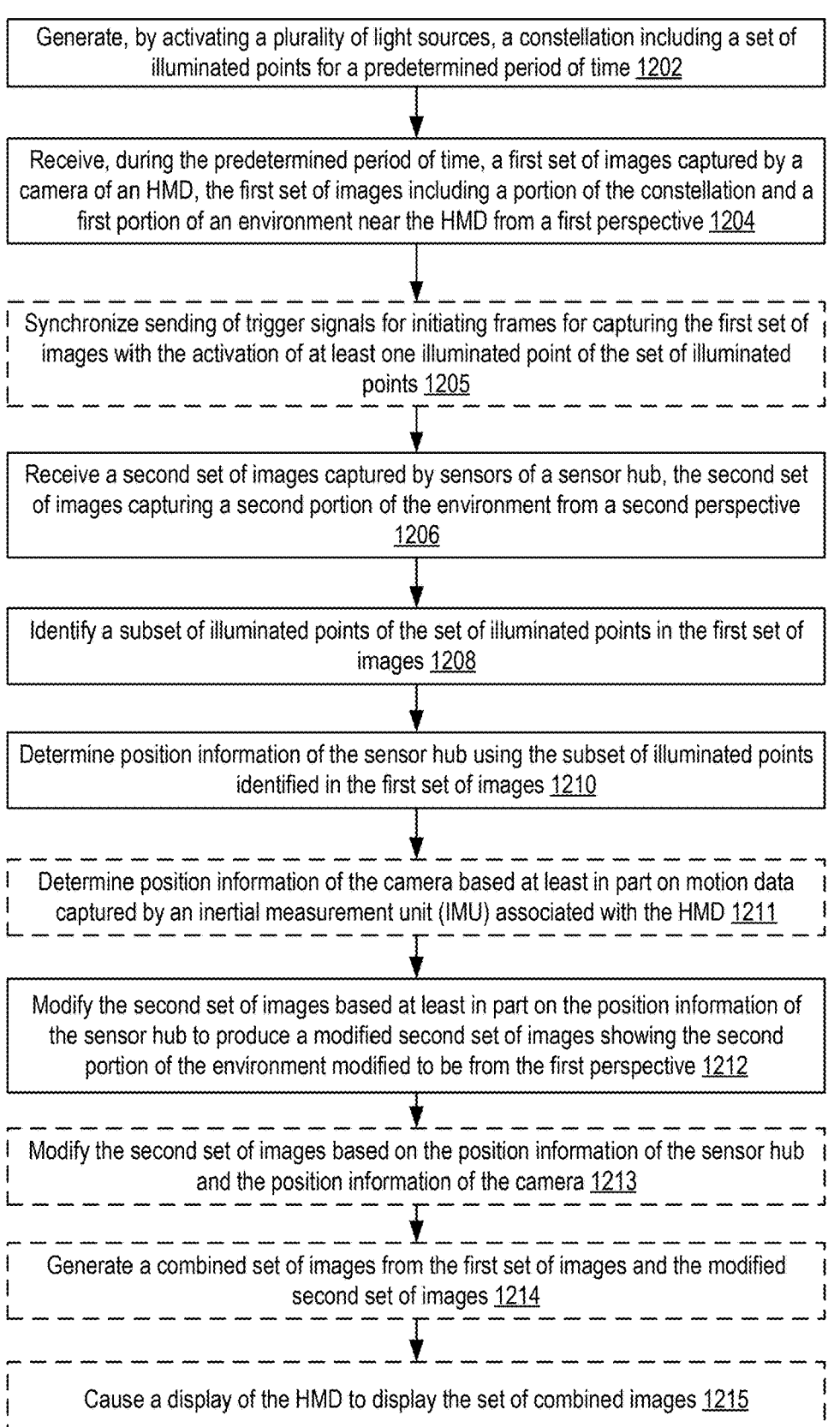
FIG. 12 illustrates a flowchart of a method to modify images from a sensor hub to be from a perspective of a camera of a HMD, according to an embodiment.

FIG. 12 illustrates a flowchart of a method 1200 to modify images from a sensor hub to be from a perspective of a camera of a HMD, according to an embodiment. At 1202, a constellation can be generated by activating a plurality of light sources (e.g., the light sources 124) for a predetermined period of time (e.g., a total length of the sequence 980a), the constellation includes a set of illuminated points. The plurality of light sources may be included in a sensor hub (e.g., the sensor hub 120) and arranged in a predefined pattern (e.g., a ring). The sensor hub may be couplable to a HMD (e.g., the HMD 130). In some implementations of the method 1200, generating the constellation (block 1202) can include activating the set of illuminated points (e.g., the first, second, and third LEDs of FIGS. 11A-11C) according to a plurality of predetermined sequences (e.g., the sequences 980a, 980b, 980c) uniquely associated therewith. In some implementations of the method 1200, generating the constellation (block 1202) can include activating each illuminated point of the set of illuminated points according to the predetermined sequence (e.g., the sequence 980a) for that illuminated point (e.g., the first LED of FIGS. 11A-11C) and from the plurality of predetermined sequences.

At 1204, a first set of images (e.g., the raw frames 352) captured by a camera (e.g., the camera 132) of the HMD can be received, the first set of images including a portion of the constellation and a first portion of an environment near the HMD from a first perspective (e.g., the first perspective 670). In some implementations of the method 1200, the sending of trigger signals for initiating frames for captured the first set of images is synchronized with activation of at least one illuminated point of the set of illuminated points (optional block 1205).

At 1206, a second set of images (e.g., the raw frames 350) captured by sensors (e.g., the sensors 126) of the sensor hub can be received, the second set of images can capture a second portion of the environment from a second perspective (e.g., the second perspective 674). At block 1208, a subset of illuminated points (e.g., at least two of the LEDs 324a, 324b, 324c) of the set of illuminated points (e.g., the LEDs 324a, 324b, 324c) can be identified in the first set of images. In some implementations of the method 1200, identifying the subset of illuminated points can include identifying the predetermined sequences associated with the subset of illuminated points and from the plurality of predetermined sequences.

At block 1210, position information (e.g., the position information 672) of the sensor hub can be determined using the subset of illuminated points identified in the first set of images. In some implementations of the method 1200, determining the position information of the sensor hub can include determining the position information of the sensor hub based at least in part on motion data captured by an IMU (e.g., the IMU 328) included within the sensor hub. In some implementations of the method 1200, position information (e.g., the intrinsic parameters 673) of the camera is determined based at least in part on motion data captured by an IMU (e.g., the IMU 338) associated with the HMD (optional block 1211). In some embodiments, the position information of the camera is based on motion data captured by the IMU coupled to the camera.

At block 1212, the second set of images can be modified based at least in part on the position information of the sensor hub to produce a modified second set of images showing the second portion of the environment modified to be from the first perspective. In some implementations, the modifying of the second set of images can include (i) determining a transformation function that aligns the second perspective of the sensor hub with the first perspective of the camera based on the position information of the sensor hub and position information of the camera and (ii) using the transformation function to modify the second set of images to produce the modified second set of images. In some implementations of the method 1200, the second set of images is modified based on the position information of the sensor hub and the position information of the camera (optional block 1213). In some implementations of the method 1200, a set of combined images is generated from the first set of images and the modified second set of images (optional block 1214). In some implementations of the method 1200, display of the set of combined images is caused on a display (e.g., the displays 334a, 334b) of the HMD (optional block 1215).

FIG. 13 illustrates a flowchart of a method 1300 to modify images from a sensor hub to be from a perspective of a camera of a HMD, according to an embodiment. At block 1302, a first image captured by a camera (e.g., the camera 132) can be received, the first image including a set of fiducials (e.g., the fiducials 122) and a first portion of an environment near the HMD from a first perspective (e.g., the first perspective 670). The set of fiducials can be included in a sensor hub (e.g., the sensor hub 120) couplable to an HMD (e.g., the HMD 130). The set of fiducials can be within a field of view of the camera of the HMD. At block 1304, a second image captured by sensors (e.g., the sensors 126) of the sensor hub can be received, the second image capturing a second portion of the environment from a second perspective (e.g., the second perspective 674).

At block 1306, first position information (e.g., the position information 672) of the sensor hub can be determined based on a location of the set of fiducials in the first image. In some implementations of the method 1300, position information (e.g., the intrinsic parameters 673) of the camera can be determined based at least in part on motion data captured by an IMU (e.g., the IMU 338) associated with the HMD (optional block 1307). At block 1308, second position information (e.g., the position information 678) of the sensor hub can be determined based on the first position information of the sensor hub and position information of the camera. The second position information of the sensor hub can correspond to a position of the sensor hub in which the second perspective is aligned with the first perspective (e.g., aligned with the third perspective 679). In some implementations of the method 1300, the first position information and the second position information of the sensor hub are determined without using motion data captured by an IMU (e.g., the IMU 328) associated with the sensor hub. In other implementations of the method 1300, the first position information or the second position information of the sensor hub is determined based on motion data captured by the IMU associated with the sensor hub. At block 1310, the second image can be modified based on the second position information of the sensor hub to produce a modified second image showing the second portion of the environment modified to be from the first perspective. In some implementations of the method 1300, the modifying of the second image can include warping a view of the second portion of the environment captured by the sensor hub. In some implementations of the method 1300, a combined image is generated from the first image and the modified second image (optional block 1311). In some implementations of the method 1300, a display (e.g., the displays 334a, 334b) of the HMD is caused to display the combined image (optional block 1312).

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EE-PROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus, comprising:

a sensor hub couplable to a head-mounted display (HMD), the sensor hub including sensors and a plurality of light sources arranged in a predefined pattern; and a processor operably coupled to the sensor hub and couplable to the HMD, the processor configured to:

generate, by activating the plurality of light sources, a constellation including a set of illuminated points for a predetermined period of time;

receive, during the predetermined period of time, a first set of images captured by a camera of the HMD, the first set of images including a portion of the constellation and a first portion of an environment near the HMD from a first perspective;

receive a second set of images captured by the sensors, the second set of images capturing a second portion of the environment from a second perspective;

identify a subset of illuminated points of the set of illuminated points in the first set of images;

determine position information of the sensor hub using the subset of illuminated points identified in the first set of images; and modify the second set of images based at least in part on the position information of the sensor hub to produce a modified second set of images showing the second portion of the environment modified to be from the first perspective.

2. The apparatus of claim 1, wherein the subset of illuminated points includes at least three points.

3. The apparatus of claim 1, wherein:

each illuminated point of the set of illuminated points is configured to illuminate according to a predetermined sequence uniquely associated with that illuminated point, to collectively produce a plurality of predetermined sequences, and the processor is configured to generate the constellation by activating the set of illuminated points according to the plurality of predetermined sequences uniquely associated therewith.

4. The apparatus of claim 3, wherein for each illuminated point from the set of illuminated points:

the predetermined sequence associated with that illuminated point and from the plurality of predetermined sequences defines (1) a set of durations for activating that illuminated point and (2) a set of intervals separating adjacent durations of the set of durations, each duration of the set of durations for that predetermined sequence is greater than a minimum period of time used by that illuminated point, when activated, to reach a luminance level greater than a predetermined threshold.

5. The apparatus of claim 4, wherein the camera of the HMD is configured to capture the first set of images with an exposure having a duration that is greater than the minimum period of time.

6. The apparatus of claim 3, wherein:

the processor is configured to generate the constellation by activating each illuminated point of the set of illuminated points according to the predetermined sequence for that illuminated point and from the plurality of predetermined sequences, and the processor is further configured to synchronize sending of trigger signals for initiating frames for capturing the first set of images with the activation of at least one illuminated point of the set of illuminated points.

7. The apparatus of claim 3, wherein the processor is configured to identify the subset of illuminated points by identifying the predetermined sequences associated with the subset of illuminated points and from the plurality of predetermined sequences.

8. The apparatus of claim 1, wherein the processor is configured to determine the position information of the sensor hub further based at least in part on motion data captured by an inertial measurement unit (IMU) included within the sensor hub.

9. The apparatus of claim 1, wherein the sensor hub is couplable to the HMD via a connector and not disposed on a unitary rigid structure with the HMD, such that the sensor hub is displaceable relative to the HMD based on a pliancy of the connector.

10. The apparatus of claim 1, wherein the processor is further configured to:

determine position information of the camera based at least in part on motion data captured by an IMU associated with the HMD, and modify the second set of images based on the position information of the sensor hub and the position information of the camera.

11. The apparatus of claim 1, wherein the processor is configured to determine the position information of the sensor hub by:

determining a position of the constellation relative to a position of the camera based on locations of the subset of illuminated points in the first set of images; and determining the position of the sensor hub relative to the position of the camera based on the position of the constellation and position information of the camera.

12. The apparatus of claim 11, wherein the position information of the camera is based on motion data captured by an IMU coupled to the camera.

13. The apparatus of claim 1, wherein the processor is configured to modify the second set of images by:

determining a transformation function that aligns the second perspective of the sensor hub with the first perspective of the camera based on the position information of the sensor hub and position information of the camera; and using the transformation function to modify the second set of images to produce the modified second set of images.

14. The apparatus of claim 1, wherein the predefined pattern is a ring-like pattern.

15. The apparatus of claim 1, wherein the processor is further configured to generate a set of combined images from the first set of images and the modified second set of images.

16. The apparatus of claim 15, wherein the processor is further configured to cause a display of the HMD to display the set of combined images.

17. A non-transitory processor-readable medium storing code representing instructions to be executed by one or more processors, the instructions comprising code to cause the one or more processors to:

generate, by activating a plurality of light sources of a sensor hub, a constellation including a set of illuminated points for a predetermined period of time, the sensor hub couplable to a head-mounted display (HMD), the plurality of light sources arranged in a predefined pattern;

receive, during the predetermined period of time, a first set of images captured by a camera of the HMD, the first set of images including a portion of the constellation and a first portion of an environment near the HMD from a first perspective;

receive a second set of images captured by sensors of the sensor hub, the second set of images capturing a second portion of the environment from a second perspective;

identify a subset of illuminated points of the set of illuminated points in the first set of images;

determine position information of the sensor hub using the subset of illuminated points identified in the first set of images; and modify the second set of images based at least in part on the position information of the sensor hub to produce a modified second set of images showing the second portion of the environment modified to be from the first perspective.

18. The non-transitory processor-readable medium of claim 17, wherein:

each illuminated point of the set of illuminated points is configured to illuminate according to a predetermined sequence uniquely associated with that illuminated point, to collectively produce a plurality of predetermined sequences, and the code to cause the one or more processors to generate the constellation includes code to cause the one or more processors to generate the constellation further by activating the set of illuminated points according to the plurality of predetermined sequences.

19. The non-transitory processor-readable medium of claim 18, wherein:

the code to cause the one or more processors to generate the constellation includes code to cause the one or more processors to generate the constellation further by activating each illuminated point of the set of illuminated points according to the predetermined sequence for that illuminated point, and the instructions further comprise code to cause the one or more processors to synchronize sending of trigger signals for initiating frames for capturing the first set of images with the activation of at least one illuminated point of the set of illuminated points.

20. An apparatus, comprising:

a sensor hub couplable to a head-mounted display (HMD), the sensor hub including sensors and a set of fiducials within a field of view of a camera of the HMD, and a processor operably coupled to the sensor hub and couplable to the HMD, the processor configured to:

receive a first image captured by the camera, the first image including the set of fiducials and a first portion of an environment near the HMD from a first perspective;

receive a second image captured by the sensors, the second image capturing a second portion of the environment from a second perspective;

determine first position information of the sensor hub based on a location of the set of fiducials in the first image;

determine second position information of the sensor hub based on the first position information of the sensor hub and position information of the camera, the second position information of the sensor hub corresponding to a position of the sensor hub in which the second perspective is aligned with the first perspective; and modify the second image based on the second position information of the sensor hub to produce a modified second image showing the second portion of the environment modified to be from the first perspective.

21. The apparatus of claim 20, wherein the processor is further configured to generate a combined image from the first image and the modified second image.

22. The apparatus of claim 21, wherein the processor is further configured to cause a display of the HMD to display the combined image.

23. The apparatus of claim 20, wherein the processor is further configured to determine the position information of the camera based at least in part on motion data captured by an inertial measurement unit (IMU) associated with the HMD.

24. The apparatus of claim 23, wherein the processor is configured to determine the first position information and the second position information of the sensor hub without using motion data captured by an IMU associated with the sensor hub.

25. The apparatus of claim 20, wherein the sensor hub is couplable to the HMD via a connector and not disposed on a unitary rigid structure with the HMD, such that the sensor hub is displaceable relative to the HMD based on a pliancy of the connector.

26. The apparatus of claim 20, wherein the processor is configured to determine the first position information or determine the second position information further based on motion data captured by an IMU associated with the sensor hub.

27. The apparatus of claim 20, further comprising a connector configured to mechanically couple the sensor hub to the HMD, the connector including a hinge configured to enable the sensor hub to be rotated relative to the HMD.

28. The apparatus of claim 20, wherein the processor is configured to modify the second image by warping a view of the second portion of the environment captured by the sensor hub.

29. A non-transitory processor-readable medium storing code representing instructions to be executed by one or more processors, the instructions comprising code to cause the one or more processors to:

receive a first image captured by a camera of a head-mounted display (HMD), the first image including a set of fiducials of a sensor hub couplable to the HMD, the set of fiducials within a field of view of the camera, and a first portion of an environment near the HMD from a first perspective;

receive a second image captured by sensors of the sensor hub, the second image capturing a second portion of the environment from a second perspective;

determine first position information of the sensor hub based on a location of the set of fiducials in the first image;

determine second position information of the sensor hub based on the first position information of the sensor hub and position information of the camera, the second position information of the sensor hub corresponding to a position of the sensor hub in which the second perspective is aligned with the first perspective; and modify the second image based on the second position information of the sensor hub to produce a modified second image showing the second portion of the environment modified to be from the first perspective.

30. The non-transitory processor-readable medium of claim 29, wherein the code to cause the one or more processors to determine the first position information or the code to cause the one or more processors to determine the second position information including code to cause the one or more processors to determine the first position information or the second position information further based on motion data captured by an inertial measurement unit (IMU) associated with the sensor hub.

* * * * *